United States Patent
Min et al.

(10) Patent No.: US 11,996,881 B2
(45) Date of Patent: May 28, 2024

(54) ELECTRONIC DEVICE AND METHOD FOR CONTROLLING COMMUNICATION IN ELECTRONIC DEVICE SUPPORTING HETEROGENEOUS COMMUNICATION TECHNOLOGIES SHARING A FREQUENCY BAND

(71) Applicant: SAMSUNG ELECTRONICS CO., LTD., Suwon-si (KR)

(72) Inventors: Hyunkee Min, Suwon-si (KR); Sungbin Min, Suwon-si (KR); Yi Yang, Suwon-si (KR); Jaeho Yoon, Suwon-si (KR); Junghun Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 128 days.

(21) Appl. No.: 17/695,371

(22) Filed: Mar. 15, 2022

(65) Prior Publication Data

US 2022/0294489 A1    Sep. 15, 2022

Related U.S. Application Data

(63) Continuation of application No. PCT/KR2022/003376, filed on Mar. 10, 2022.

(30) Foreign Application Priority Data

Mar. 15, 2021   (KR) .................. 10-2021-0033387

(51) Int. Cl.
*H04B 1/7163*    (2011.01)
*H04W 28/02*    (2009.01)
*H04W 84/12*    (2009.01)

(52) U.S. Cl.
CPC ...... *H04B 1/7163* (2013.01); *H04W 28/0268* (2013.01); *H04W 84/12* (2013.01)

(58) Field of Classification Search
CPC . H04B 1/7163; H04W 28/0268; H04W 84/12
See application file for complete search history.

(56) References Cited

U.S. PATENT DOCUMENTS

| 10,382,075 B1 | 8/2019 | Arool Emmanuel et al. |
| 2006/0227045 A1 | 10/2006 | Sheynblat |

(Continued)

FOREIGN PATENT DOCUMENTS

| KR | 10-2008-0092957 A | 10/2008 |
| KR | 10-2012-0063917 A | 6/2012 |
| KR | 10-2014-0033677 A | 3/2014 |

OTHER PUBLICATIONS

International Search Report (PCT/ISA/210) dated Jun. 13, 2022 by the International Searching Authority in International Patent Application No. PCT/KR2022/003376.

(Continued)

*Primary Examiner* — Janice N Tieu
(74) *Attorney, Agent, or Firm* — Sughrue Mion, PLLC

(57) ABSTRACT

According to various embodiments, an electronic device may comprise an ultra-wideband (UWB) communication circuit, a Wi-Fi communication circuit and a processor controlling the UWB communication circuit and the Wi-Fi communication circuit. The processor may be configured to identify an operation channel of the UWB communication circuit, identify a communication band of the Wi-Fi communication circuit, overlapping the operation channel of the UWB communication circuit, and when the communication band overlapping the operation channel is activated, determine whether to simultaneously perform Wi-Fi communication through the activated communication band and UWB (Continued)

communication through the operation channel. Other various embodiments are possible as well.

20 Claims, 14 Drawing Sheets

(56) References Cited

U.S. PATENT DOCUMENTS

| | | |
|---|---|---|
| 2008/0062919 A1 | 3/2008 | Chen et al. |
| 2009/0073060 A1 | 3/2009 | Shimasaki et al. |
| 2009/0147763 A1 | 6/2009 | Desai et al. |
| 2010/0322287 A1 | 12/2010 | Truong et al. |
| 2014/0073244 A1 | 3/2014 | Ko et al. |
| 2014/0211720 A1 | 7/2014 | Thoukydides |
| 2021/0076396 A1* | 3/2021 | Chen .................. H04W 72/542 |

OTHER PUBLICATIONS

Written Opinion (PCT/ISA/237) dated Jun. 13, 2022 by the International Searching Authority in International Patent Application No. PCT/KR2022/003376.

* cited by examiner

ELECTRONIC DEVICE AND METHOD FOR CONTROLLING COMMUNICATION IN ELECTRONIC DEVICE SUPPORTING HETEROGENEOUS COMMUNICATION TECHNOLOGIES SHARING A FREQUENCY BAND

CROSS-REFERENCE TO RELATED APPLICATIONS

This application is a continuation of International Application No. PCT/KR2022/003376 designating the United States, filed on Mar. 10, 2022, in the Korean Intellectual Property Receiving Office and claiming priority to Korean Patent Application No. 10-2021-0033387, filed on Mar. 15, 2021, in the Korean Intellectual Property Office, the disclosures of which are incorporated by reference herein in their entireties.

BACKGROUND

1. Field

Various embodiments of the present disclosure relate to an electronic device and a method for controlling communication in an electronic device supporting heterogeneous communication technologies sharing a frequency band.

2. Description of Related Art

Ultra-wideband (UWB) may refer to a communication technology for transmitting signals using very short pulses (e.g., several nanoseconds) with low power over a wide band. UWB has been used for military purposes, such as military radar and remote detection. However, the use of UWB may be expanded into other various sectors following an allowance for the commercial use of UWB within a range limited to indoor radio communication.

Impulse-radio ultra-wideband (IR-UWB) may transmit and receive very short pulses in a wide frequency band and may precisely measure the time of arrival (TOA) and/or time of flight (TOF), which may refer to the time at which the pulse reaches the target. Consequently, IR-UWB may provide for precise distance and position recognition technology, within a small margin of error (e.g. in the order of tens of centimeters), in indoors and/or outdoors scenarios. IR-UWB may have a low spectral power density in a wide frequency band, may provide for transmittance through buildings, walls, and/or partitions, and/or may be capable of communication with relatively low power and provide protection from multipath interference. Further, IR-UWB may be capable of measuring a relatively accurate time when the UWB pulse is reflected by the target, and, as such, may be for use as a radar technology.

UWB may be an attractive option, as a technology capable of precise positioning and tracking, for becoming a basis for a possible future Internet-of-Things (IoT) society and/or an ubiquitous technology environment. That is, UWB may potentially have applications in various sectors, such as indoor/outdoor positioning, indoor navigation, asset tracking, disaster-related industrial robots, home and building automation, vehicle and home smart key services, and unmanned payment systems.

Wireless local area networks (WLAN), which may also be referred to as wireless LAN or Wireless-Fidelity (Wi-Fi), may refer to building up a network environment from a hub to one or more terminals using radio frequencies and/or light, instead of wired cables, in an indoor and/or outdoor environment. Typically, a WLAN may be limited to a predetermined space and/or building, such as an office, a store, a home, or a public park. A WLAN may not require extensive wiring, may facilitate redeployment of terminals, may enable communication with moving terminals (e.g., not fixed in a particular location), and, consequently, may allow a network to be established quickly. Further, a WLAN may be capable of transmitting/receiving significant amounts of data with low transmission latency and, as such, may be used to provide various services in a diversity of sectors. There exists a need for further improvements in wireless communication technology. In particular, improving heterogeneous communication technologies sharing a frequency band is desired. Improvements are presented herein. These improvements may also be applicable to other multi-access technologies and the telecommunication standards that employ these technologies.

SUMMARY

Under certain channel conditions, channels used by UWB technology may overlap and/or be adjacent to one or more portions of a frequency band used by WLAN technology. When a channel used by the UWB technology overlaps and/or is adjacent to at least a portion of the frequency band used by the WLAN technology, interference may occur between a UWB signal transmitted through the channel and a WLAN signal transmitted through the portion of the frequency band, and, consequently, the quality of a UWB communication carried by the UWB signal and/or the quality of a WLAN communication carried by the WLAN signal may deteriorate.

According to various embodiments, an electronic device may provide a method for preventing degradation of the quality of the UWB communication and/or the WLAN communication when the channel used by the UWB technology and the frequency band used by the WLAN technology overlap and/or are adjacent to each other.

According to various embodiments, an electronic device may include an UWB communication circuit, a Wi-Fi communication circuit and a processor controlling the UWB communication circuit and the Wi-Fi communication circuit. The processor may be configured to identify an operation channel of the UWB communication circuit, identify a communication band of the Wi-Fi communication circuit, overlapping the operation channel of the UWB communication circuit, and based on the communication band overlapping the operation channel being activated, determine whether to simultaneously perform Wi-Fi communication through the activated communication band and UWB communication through the operation channel.

According to various embodiments, a method for controlling communication of an electronic device may include identifying an operation channel of an UWB communication circuit of the electronic device, identifying a communication band of a Wi-Fi communication circuit of the electronic device overlapping the operation channel of the UWB communication circuit, and based on the communication band overlapping the operation channel being activated, determining whether to simultaneously perform Wi-Fi communication through the activated communication band and UWB communication through the operation channel.

According to various embodiments of the disclosure, an electronic device may stably execute a UWB service and a WLAN service using a specific frequency band.

BRIEF DESCRIPTION OF THE DRAWINGS

The same or similar reference notations may be used to refer to the same or similar elements throughout the specification and the drawings.

DETAILED DESCRIPTION

Hereinafter, various embodiments of the disclosure are described with reference to the accompanying drawings.

Figure 1:
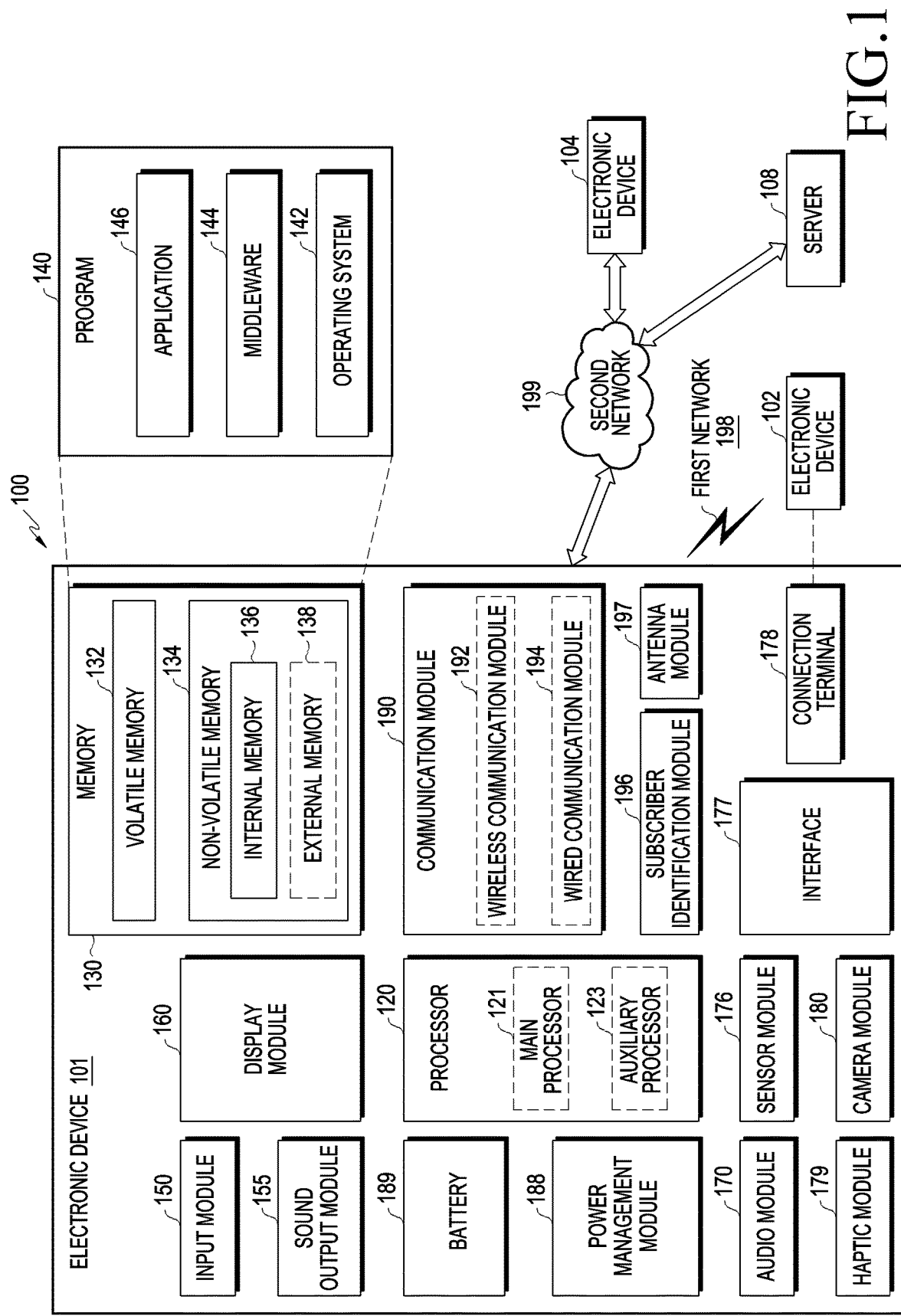
FIG. 1 is a block diagram illustrating an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
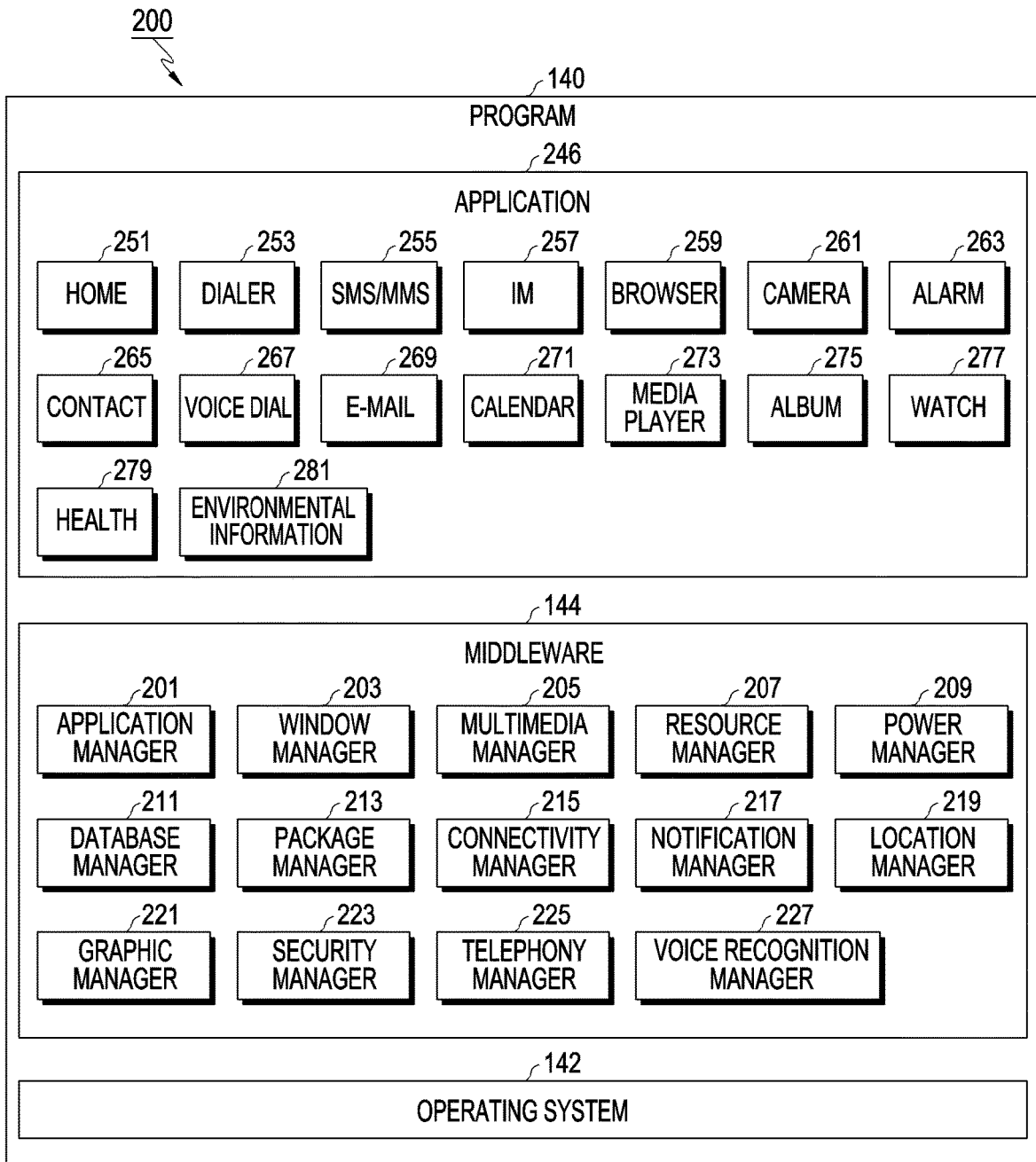
FIG. 2 is a block diagram illustrating an example of a program, according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3A:
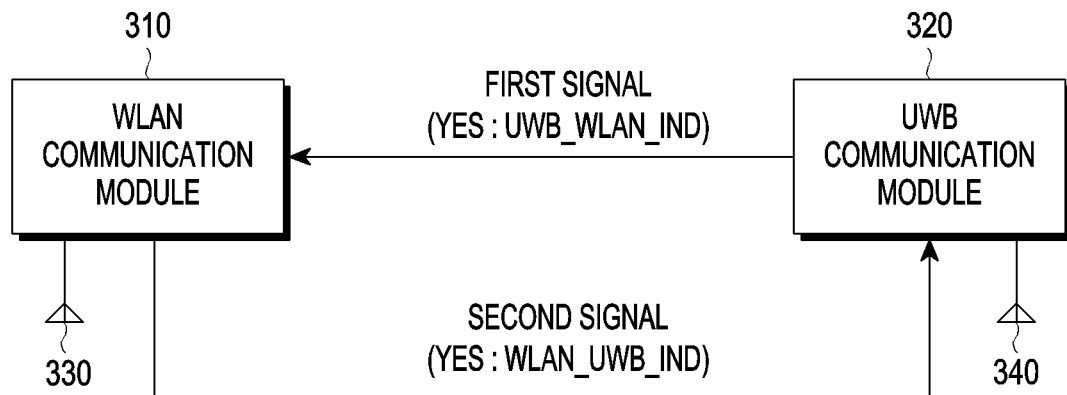
FIG. 3A is a view illustrating an example of an internal structure of an electronic device, according to various embodiments of the disclosure.
Figure 3B:
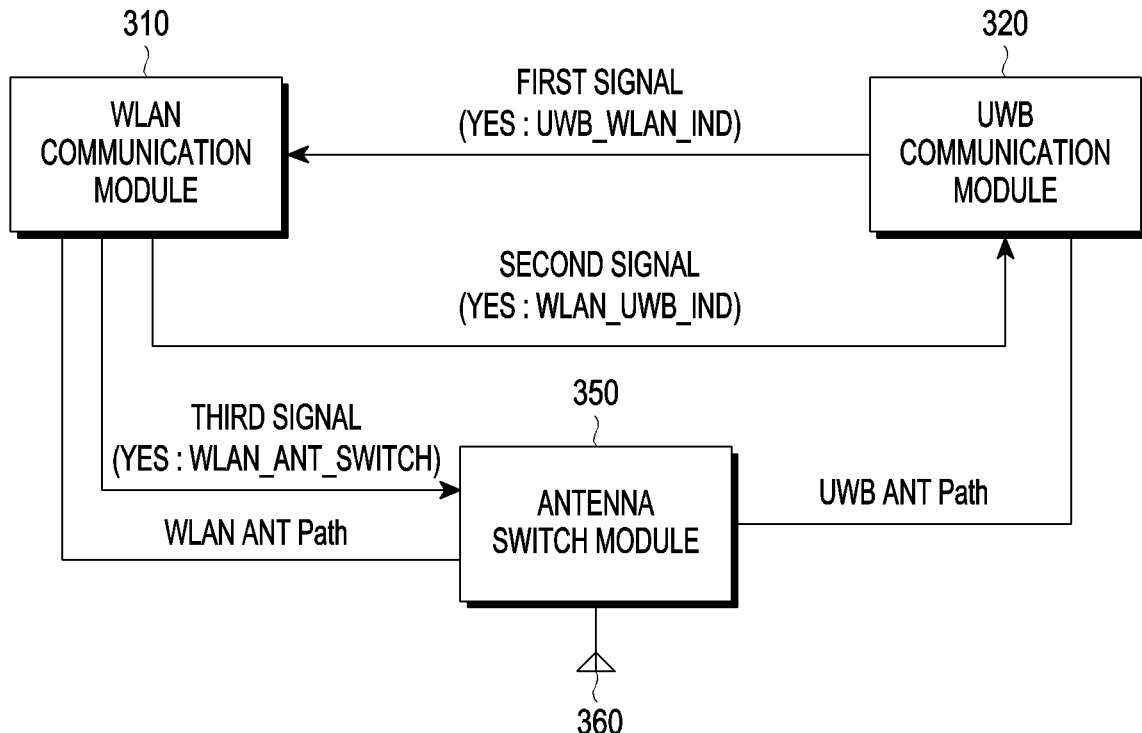
FIG. 3B is a view illustrating an example of an internal structure of an electronic device, according to various embodiments of the disclosure.

FIGS. 3A and 3B are views illustrating examples of an internal structure of an electronic device, according to various embodiments of the disclosure.

According to various embodiments, an electronic device (e.g., the electronic device 101 of FIG. 1) may include a WLAN communication module 310 (e.g., the communication module 190 of FIG. 1), a UWB communication module 320 (e.g., the communication module 190 of FIG. 1), and an antenna 330, 340, or 360 (e.g., the antenna module 197 of FIG. 1).

According to various embodiments, the WLAN communication module 310 may use a frequency band such as 2.4 GHz, 5 GHz, and/or 6 GHz, and the UWB communication module 320 may use a frequency band ranging from 3.1 GHz to 10.6 GHz. In some embodiments, a specific frequency band (e.g., 6 GHz) may be used by the WLAN communication module 310 and the UWB communication module 320. As shown in FIG. 3A, the WLAN communication module 310 and the UWB communication module 320 may use different antennas 330 and 340, for example. The WLAN communication module 310 and the UWB communication module 320 may share an antenna 360, as shown in FIG. 3B. The WLAN communication module 310 and the UWB communication module 320 may use antennas 330, 340, and/or 360 to transmit and/or receive signals in a second frequency band. In some embodiments, when the WLAN communication module 310 and the UWB communication module 320 share the antenna 360, the electronic device 101 may further include an antenna switch module 350. In other embodiments, the antennas 330, 340 and/or 360 may each include a plurality of antennas. According to some embodiments, the WLAN communication module 310 may support multiple-input and multiple-output (MIMO) technology through the antenna 330 and/or 360.

According to various embodiments, the specific frequency band (e.g., 6 GHz) may be a frequency band available to both the WLAN communication module 310 and the UWB communication module 320. For example, the specific frequency band may be a frequency band in which interference may occur between the WLAN communication module 310 and the UWB communication module 320 among frequency bands available to both the WLAN communication module 310 and the UWB communication module 320. According to various embodiments, referring to FIG. 3A, the WLAN communication module 310 may be connected (e.g., communicatively coupled) with a first antenna 330, and the UWB communication module 320 may be connected (e.g., communicatively coupled) with the second antenna 340. The first antenna 330 connected with the WLAN communication module 310 and/or the second antenna 340 connected with the UWB communication module 320 may transmit or receive a signal in the specific frequency band (e.g., 6 GHz).

According to various embodiments, the WLAN communication module 310 may be electrically connected with the first antenna 330 to receive a signal from another device (e.g., the electronic device 102 of FIG. 1) and/or transmit a generated signal to another device. The WLAN communication module 310 may be electrically connected with the UWB communication module 320. The WLAN communication module 310 may be electrically connected with the UWB communication module 320 to transmit a second signal (e.g., WLAN_UWB_IND) to the UWB communication module 320. For example, the second signal may indicate whether the WLAN communication module 310 uses the specific frequency band (e.g., 6 GHz) and/or comprise information regarding the frequency band being used. According to various embodiments, the WLAN communication module 310 may change a configuration of the second signal (e.g., signal strength) to a high level to use the specific frequency band. For example, the WLAN communication module 310 may change the signal strength (e.g., voltage level) of the second signal to the high level to use the specific frequency band and may maintain the signal strength of the second signal at the high level until the use of the specific frequency band is terminated. According to various embodiments, when the use of the specific frequency band is terminated, the WLAN communication module 310 may change the signal strength of the second signal to a low level. For example, when the use of the specific frequency band is terminated, the WLAN communication module 310 may change the signal strength of the second signal (e.g., voltage level) to the low level (e.g., a ground potential) and may maintain the signal strength until the use of the second frequency band is started. The WLAN communication module 310 may change the second signal to the low level to use the specific frequency band, and/or may change the second signal to the high level to indicate that the use of the specific frequency band is terminated.

In some embodiments, the WLAN communication module 310 may be electrically connected with the UWB communication module 320 to receive a first signal (e.g., UWB_WLAN_IND) from the UWB communication module 320.

According to various embodiments, when the WLAN communication module 310 provides a WLAN service using a frequency band (e.g., 2.4 GHz, 5 GHz) other than the specific frequency band (e.g., 6 GHz), the second signal (e.g., signal strength) may be set at the low level. That is, the WLAN communication module 310 may change the signal strength of the second signal to the low level and/or maintain the signal strength of the second signal at the low level. According to various embodiments, the UWB communication module 320 may be electrically connected with the second antenna 340 to receive a signal from another device (e.g., the electronic device 102 of FIG. 1) and/or transmit a generated signal to another device. The UWB communication module 320 may be electrically connected with the WLAN communication module 310. The UWB communication module 320 may be electrically connected with the WLAN communication module 310 to transmit a first signal (e.g., UWB_WLAN_IND) to the WLAN communication module 310. For example, the first signal may indicate whether the UWB communication module 320 uses the specific frequency band (e.g., 6 GHz) and/or comprise information regarding the frequency band being used. According to various embodiments, the UWB communication module 320 may change a configuration of the first signal to the high level to use the specific frequency band. For example, the UWB communication module 320 may change the signal strength (e.g., voltage level) of the first signal to the high level to use the specific frequency band (e.g., 6 GHz) and may maintain the signal strength until the use of the specific frequency band is terminated. According to various embodiments, when the use of the specific frequency band (e.g., 6 GHz) is terminated, the UWB communication module 320 may change the first signal to the low level. The UWB communication module 320 may change the signal strength of the first signal (e.g., the voltage level) to the low level (e.g., a ground potential) if the use of the specific frequency band is terminated and maintain the strength until the use of the specific frequency band is started again. The UWB communication module 320 may change the first signal to the low level to use the specific frequency band, and/or may change the first signal to the high level to indicate that the use of the specific frequency band is terminated. The UWB communication module 320 may be electrically or operatively connected with the WLAN communication module 310 to receive a second signal (e.g., WLAN_UWB_IND) from the UWB communication module 320. According to various embodiments, when the UWB communication module 320 executes a UWB service using a frequency band other than the specific frequency band (e.g., 6 GHz), the first signal (e.g., signal strength) may be set at the low level. When the UWB communication module 320 executes a UWB service using a frequency band other than the specific frequency band (e.g., 6 GHz), the strength of the first signal may be maintained at the low level.

According to various embodiments, the first signal and/or the second signal may be a GPIO signal, and when the state (e.g., the value of the signal) is changed (e.g., high→low, or low→high), it may be generated in an interrupt scheme.

According to various embodiments, referring to FIG. 3B, the WLAN communication module 310 and the UWB communication module 320 may be connected with the antenna 360 through the antenna switch module 350. The WLAN communication module 310 and the UWB communication module 320 may share the antenna 360 so that at least part thereof transmits and/or receives signals in the same or similar frequency bands. According to various embodiments, the WLAN communication module 310 may control the antenna switch module 350, as a host in the relationship with the UWB communication module 320. For example, the host may control the antenna switch module 350 to selectively change the antenna path (e.g., WLAN ANT Path or UWB ANT Path).

According to various embodiments, the WLAN communication module 310 may be electrically connected with the antenna switch module 350 to control the antenna switch module 350. The WLAN communication module 310 may be electrically connected with the antenna switch module 350 to transmit a third signal (e.g., WLAN_ANT_SWITCH) to the antenna switch module 350. For example, the third signal may be a signal for controlling the antenna switch module 350. For example, the WLAN communication module 310 may change the third signal (e.g., signal strength) to the low level so that the UWB communication module 320 may use the antenna 360. For example, the WLAN communication module 310 may change the third signal (e.g., signal strength) to the high level, so that the WLAN communication module 310 may use the antenna 360. The WLAN communication module 310 may change the third signal to the low level to configure the antenna switch module 350 to communicatively couple the WLAN communication module 310 to the antenna 360, and/or the WLAN communication module 310 may change the third signal to the high level to configure the antenna switch module 350 to communicatively couple the UWB communication module 320 to the antenna 360.

According to various embodiments, the third signal may be determined based on the first signal and the second signal. For example, when the UWB communication module 320 may change the first signal (e.g., signal strength) to the high level to use the specific frequency band (e.g., 6 GHz), and the WLAN communication module 310 terminates the use of the specific frequency band and changes the second signal (e.g., signal strength) to the low level, the third signal (e.g., signal strength) may be changed to the low level.

According to various embodiments, the first to third signals may be GPIO signals, and when the state (e.g., signal strength) of the first to third signals is changed (e.g., high→low, or low→high), they may be generated in their respective interrupt schemes.

According to some embodiments, when the WLAN communication module 310 and the UWB communication module 320 share the antenna 360, the UWB communication module 320 may operate as the host of the antenna switch module 350. In such embodiments, the UWB communication module 320 may transmit a fourth signal (not shown) for controlling the antenna switch module 350 to selectively change the antenna path (e.g., WLAN ANT Path or UWB ANT Path). The UWB communication module 320 may determine the fourth signal based on the first signal and the second signal.

Figure 4A:
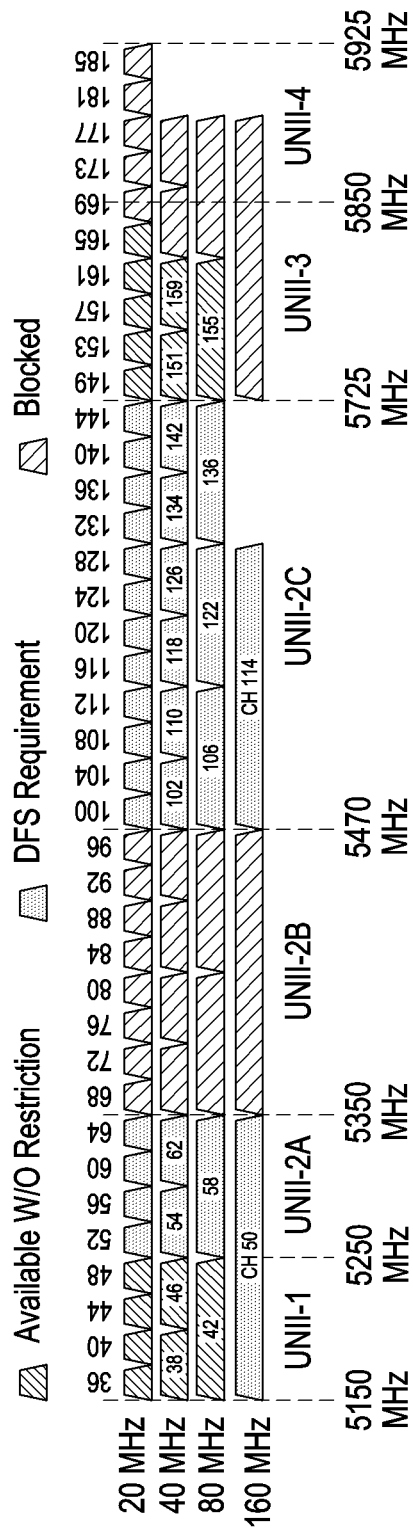
FIG. 4A is a view illustrating a 5 GHz Wi-Fi frequency band, according to various embodiments of the disclosure.
Figure 4B:
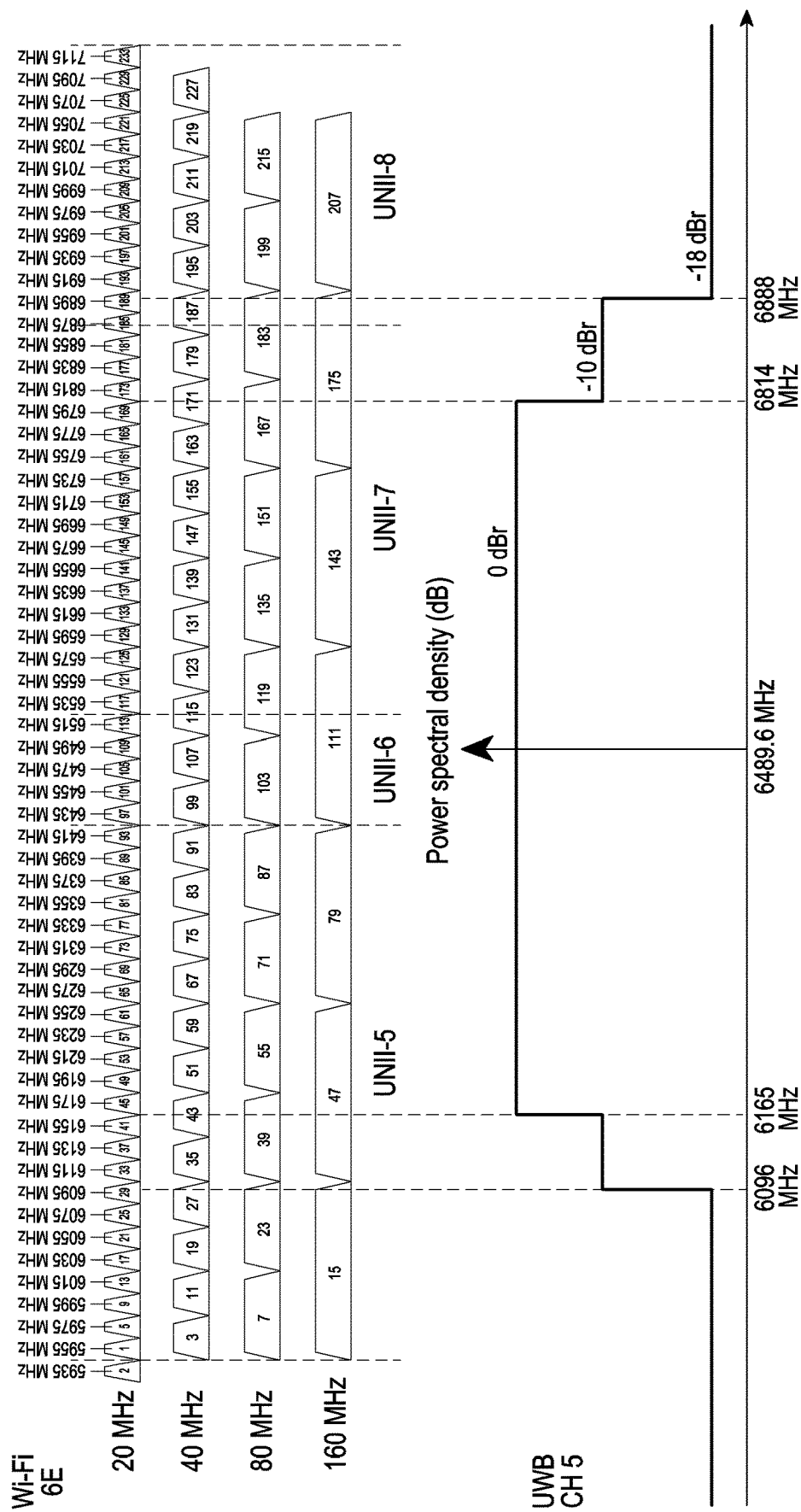
FIG. 4B is a view illustrating a 6 GHz Wi-Fi frequency band and a UWB channel, according to various embodiments of the disclosure.

FIG. 4A is a view illustrating a 5 GHz Wi-Fi frequency band according to various embodiments. FIG. 4B is a view illustrating a Power Spectral Density for a 6 GHz Wi-Fi frequency band and UWB channel 5.

Referring to FIG. 4A, the 5 GHz Wi-Fi frequency band may be set to be able to use Wi-Fi in an unlicensed band of 5,150 to 5,925 MHz. Referring to FIG. 4B, the 6 GHz Wi-Fi frequency band may be set to be able to use Wi-Fi in an unlicensed band of 5,925 to 7,125 MHz.

WLAN has grown as a leading technology for networking, and with the proliferation of smart devices, such as smartphones and tablets, the number of devices equipped with wireless local area networks may significantly increase. Consequently, the 2.4 GHz and the 5 GHz frequency bands used by WLAN devices may become saturated due to the increase in wireless LAN usage. One possible approach to potentially reduce the saturation of these frequency bands may be to allow use of the 6 GHz frequency band as an unlicensed band, which may avoid interference with conventional Institute of Electrical and Electronics Engineers (IEEE) 802.11n and/or 802.11ac standards that use the 2.4 GHz and 5 GHz frequency bands. To that end, the Wi-Fi Alliance (WFA) may establish standards that may allow use of Wi-Fi in an unlicensed band of 5,925 to 7,125 MHz, which may be referred to as Wi-Fi 6E, and as shown in FIG. 4B. Use of the 6 GHz frequency band for Wi-Fi communication may increase availability of network resources and/or may enable traffic distribution within the spectrum band, and, as such, allow for improvements to communication efficiency. For example, in the conventional 5 GHz band, the number of channels capable of using a broad bandwidth of 160 MHz may be small. However, the number of channels capable of using a bandwidth of 160 MHz in the 6 GHz frequency band may be increased (e.g., up to seven). Consequently, the embodiments described herein may provide a high transmission rate to users.

Table 1 shows a UWB channel list based on the IEEE 802.15.4 UWB standard. Referring to Table 1, when the UWB communication device uses one of channel 5, 6, 7, or 8, the UWB channel may overlap a channel within the Wi-Fi 6 GHz frequency band. For example, referring to FIG. 4B, UWB channel 5 may overlap some of channels 29 to 189 in the Wi-Fi 6 GHz frequency band. For example, UWB channel 7 may overlap all the Wi-Fi 6 GHz channels. For another example, when UWB channel 9 is used, there may be no overlapping band between for Wi-Fi communication and UWB communication. That is, depending on the UWB channel used, the UWB channel band overlapping with Wi-Fi communication may vary.

TABLE 1

| Channel Number | Center Frequency (MHz) | Bandwidth (MHz) |
| --- | --- | --- |
| 1 | 3494.4 | 499.2 |
| 2 | 3993.6 | 499.2 |
| 3 | 4492.8 | 499.2 |
| 4 | 3993.6 | 1331.2 |
| 5 | 6489.6 | 499.2 |
| 6 | 6988.8 | 499.2 |
| 7 | 6489.6 | 1081.6 |
| 8 | 7488 | 499.2 |
| 9 | 7987.2 | 499.2 |

Various embodiments described below may address degradation of communication quality due to communication interference between Wi-Fi communication and UWB communication that may occur when Wi-Fi communication and UWB communication use overlapping bands, as shown in FIG. 4B.

Figure 5A:
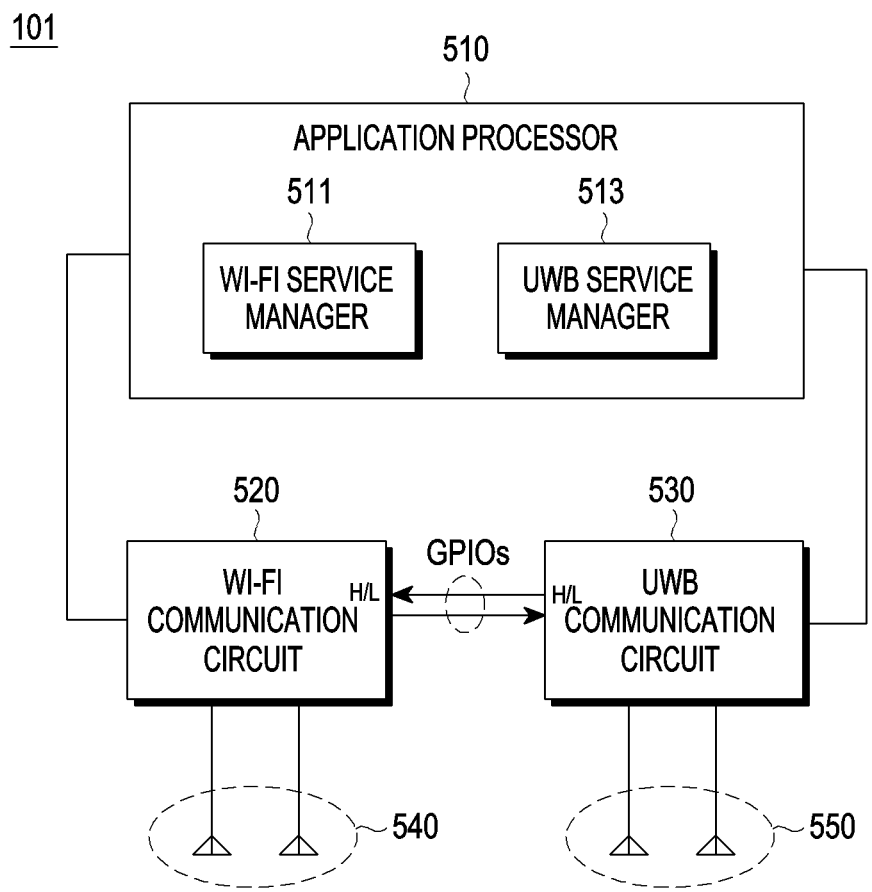
FIG. 5A is a view illustrating an example of an internal structure of an electronic device according to various embodiments of the disclosure.

FIG. 5A is a view illustrating another example of an internal structure of an electronic device, according to various embodiments of the disclosure.

Referring to FIG. 5A, an electronic device 101 may include an application processor 510 (e.g., the processor 120 of FIG. 1), a Wi-Fi communication circuit 520 (e.g., the communication module 190 of FIG. 1), a UWB communication circuit 530 (e.g., the communication module 190 of FIG. 1), a first antenna group 540 (e.g., the antenna module 197 of FIG. 1), and a second antenna group 550 (e.g., the antenna module 197 of FIG. 1). According to various embodiments, the application processor 510 may be implemented in the processor 120 illustrated in FIG. 1 and/or may be implemented as the main processor 121.

The application processor 510 may be physically and/or electrically connected with the Wi-Fi communication circuit 520 and the UWB communication circuit 530. According to various embodiments, the application processor 510 may transmit a control signal for controlling the operation of each of the Wi-Fi communication circuit 520 and the UWB communication circuit 530. According to various embodiments, the application processor 510 may receive information and/or data from the Wi-Fi communication circuit 520 and/or from the UWB communication circuit 530.

According to various embodiments, the application processor 510 may include a Wi-Fi service manager 511 and a UWB service manager 513. For example, the Wi-Fi service manager 511 and the UWB service manager 513 may be stored in a memory (e.g., the memory 130 of FIG. 1), as a program (e.g., the program 140 of FIG. 1), and may be executed by the application processor 510. According to various embodiments, the Wi-Fi service manager 511 and the UWB service manager 513 may correspond to the middleware (e.g., the middleware 144 of FIG. 1) of the program and may correspond to at least some functions included in the connectivity manager 215 of FIG. 2. According to various embodiments, the Wi-Fi service manager 511 and the UWB service manager 513 may be configured as hardware modules or software modules, and the Wi-Fi service manager 511 and the UWB service manager 513 may be configured in the same chip or in different chips. According to various embodiments, the Wi-Fi service manager 511 may control the operation of the Wi-Fi communication circuit 520, and the UWB service manager 513 may control the operation of the UWB communication circuit 530. According to various embodiments, the Wi-Fi service manager 511 may obtain application information using Wi-Fi and/or a requirement for Wi-Fi latency from the application processor 510 and may control the operation (e.g., coexistence) in which the Wi-Fi communication circuit 520 operates simultaneously with the UWB communication circuit 530.

According to various embodiments, the Wi-Fi service manager 511 and the UWB service manager 513 may exchange information through a service interface and/or a software interface. For example, the Wi-Fi service manager 511 and the UWB service manager 513 may add a function to at least one of a source file for a Wi-Fi service and a source file for a UWB service or exchange information in the manner to invoke a specific service. According to various embodiments, the Wi-Fi communication circuit 520 and the UWB communication circuit 530 may transmit/receive information between devices through a GPIO connection. For example, the UWB communication circuit 530 may transfer information, such as a 'High' or 'Low' status, to the Wi-Fi communication circuit 520 through a first GPIO. For example, the Wi-Fi communication circuit 520 may transfer information, such as a 'High' or 'Low' status, to the UWB communication circuit 530 through a second GPIO.

According to various embodiments, the application processor 510 may determine an operating channel of the UWB communication circuit 530 and may identify the communication band of the Wi-Fi communication circuit 520 overlapping the operation channel of the UWB communication circuit 530. As a result of the identification, when the communication band overlapping the operation channel is activated, the application processor 510 (e.g., the Wi-Fi service manager 511 and/or the UWB service manager 513) may determine whether to simultaneously perform Wi-Fi communication through the activated communication band and UWB communication through the operation channel. According to various embodiments, the Wi-Fi service manager 511 may receive first information related to the UWB communication from the UWB service manager 513. According to various embodiments, the first information related to the UWB communication may include at least one of the operation channel of the UWB communication, a period of the UWB communication, duration of the UWB communication, or priority information for the service of the UWB communication. According to various embodiments, the Wi-Fi service manager 511 may transmit second information related to the Wi-Fi communication to the UWB service manager 513. According to various embodiments, the second information related to the Wi-Fi communication may include at least one of a traffic pattern of the Wi-Fi communication, a quality of service (QoS) of the Wi-Fi communication, and priority information for the service of the Wi-Fi communication. According to various embodiments, the Wi-Fi service manager 511 may determine whether to simultaneously perform the Wi-Fi communication and the UWB communication based on the first information related to the UWB communication and the second information related to the Wi-Fi communication.

According to various embodiments, the UWB communication circuit 530 and the Wi-Fi communication circuit 520 may communicate through a GPIO scheme. When the communication band of the Wi-Fi communication circuit 520 overlapping the operation channel of the UWB communication circuit 530 is activated, the UWB communication circuit 530 may transmit the first signal set to the high status through the first GPIO to the Wi-Fi communication circuit 520, and the Wi-Fi communication circuit 520 may transmit the second signal set to the high status through the second GPIO to the UWB communication circuit 530.

According to various embodiments, the UWB service manager 513 may receive a request for use of the communication band overlapping the operation channel from the Wi-Fi service manager 511. According to various embodiments, the UWB service manager 513 may identify whether the operation channel may be changed and change the operating channel according to the result of the identification. According to various embodiments, the Wi-Fi service manager 511 may receive a request for use of the operation channel overlapping the communication band from the UWB service manager 513. According to various embodiments, the Wi-Fi service manager 511 may identify whether the communication band may be changed and change the communication band according to the result of the identification.

According to various embodiments, the Wi-Fi service manager 511 may determine whether the UWB communication through the operating channel may be performed simultaneously with Wi-Fi communication through the communication band overlapping the operating channel. According to various embodiments, when the UWB communication through the operation channel and the Wi-Fi communication through the communication band are not simultaneously performed, the Wi-Fi service manager 511 or the UWB service manager 513 may determine priority between the first service for the UWB communication and the second service for the Wi-Fi communication. According to various embodiments, when the priority of the first service for the UWB communication is higher than the priority of the second service for the Wi-Fi communication, the Wi-Fi service manager 511 may change the channel for use in Wi-Fi communication in the communication band. According to various embodiments, if the priority of the first service for the UWB communication is not higher than the priority of the second service for the Wi-Fi communication, the UWB service manager 513 may change the operation channel for the UWB communication to another channel. According to various embodiments, even when the UWB communication through the operation channel and the Wi-Fi communication through the communication band are simultaneously performed, the Wi-Fi service manager 511 or the UWB service manager 513 may determine priority between the first service for the UWB communication and the second service for the Wi-Fi communication and perform communication considering the determined priority.

Figure 5B:
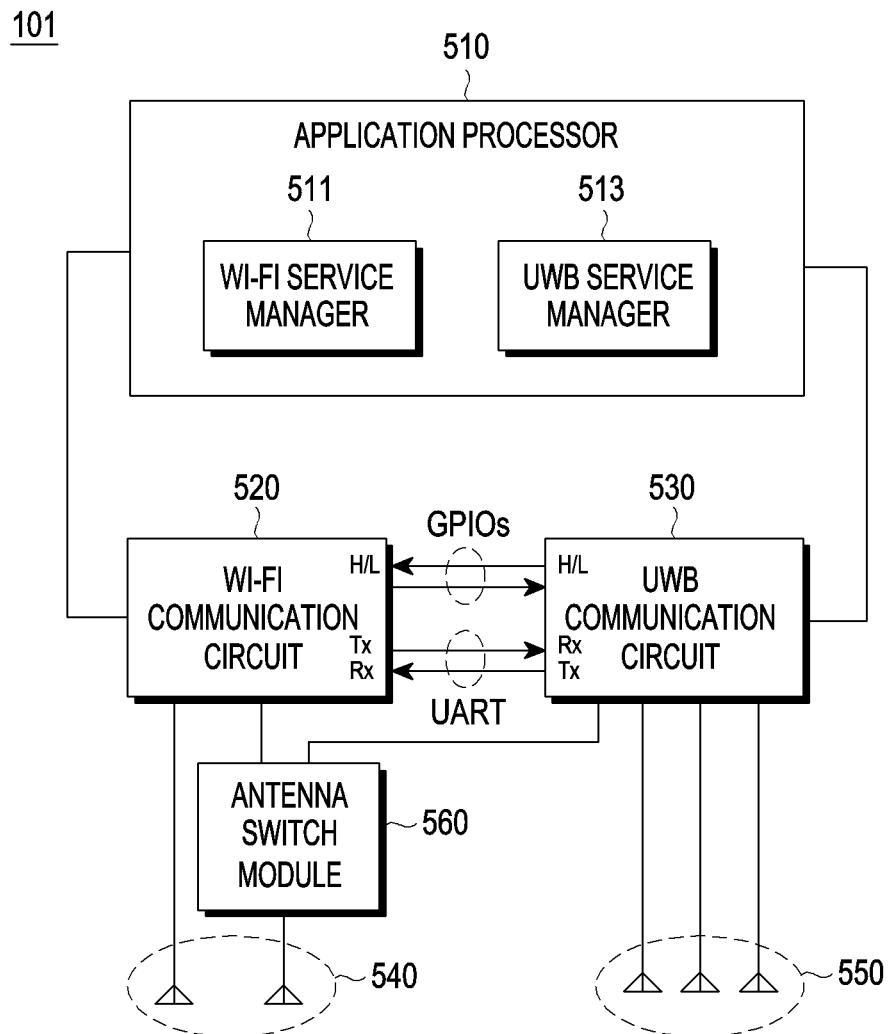
FIG. 5B is a view illustrating an example of an internal structure of an electronic device, according to various embodiments of the disclosure.

FIG. 5B is a view illustrating another example of an internal structure of an electronic device according to various embodiments of the disclosure.

Referring to FIG. 5B, an electronic device 101 may include an application processor 510 (e.g., the processor 120 of FIG. 1), a Wi-Fi communication circuit 520 (e.g., the communication module 190 of FIG. 1), a UWB communication circuit 530 (e.g., the communication module 190 of FIG. 1), a first antenna group 540 (e.g., the antenna module 197 of FIG. 1), a second antenna group 550 (e.g., the antenna module 197 of FIG. 1), and an antenna switch module 560 (e.g., the antenna module 197 of FIG. 1). According to various embodiments, the application processor 510 may be implemented in the processor 120 illustrated in FIG. 1 and/or may be implemented as the main processor 121.

The application processor 510 may be physically and/or electrically connected with the Wi-Fi communication circuit 520 and the UWB communication circuit 530. According to various embodiments, the application processor 510 may transmit a control signal for controlling the operation of each of the Wi-Fi communication circuit 520 and the UWB communication circuit 530. According to various embodiments, the application processor 510 may receive information and/or data from the Wi-Fi communication circuit 520 and/or from the UWB communication circuit 530.

According to various embodiments, the application processor 510 may include a Wi-Fi service manager 511 and a UWB service manager 513. For example, the Wi-Fi service manager 511 and the UWB service manager 513 may be stored in a memory (e.g., the memory 130 of FIG. 1), as a program (e.g., the program 140 of FIG. 1), and may be executed by the application processor 510. According to various embodiments, the Wi-Fi service manager 511 and the UWB service manager 513 may correspond to the middleware (e.g., the middleware 144 of FIG. 1) of the program and may correspond to at least some functions included in the connectivity manager 215 of FIG. 2. According to various embodiments, the Wi-Fi service manager 511 and the UWB service manager 513 may be configured as hardware modules or software modules, and the Wi-Fi service manager 511 and the UWB service manager 513 may be configured in the same chip or in different chips. According to various embodiments, the Wi-Fi service manager 511 may control the operation of the Wi-Fi communication circuit 520, and the UWB service manager 513 may control the operation of the UWB communication circuit 530. According to various embodiments, the Wi-Fi service manager 511 may obtain application information using Wi-Fi and/or a requirement for Wi-Fi latency from the application processor 510 and may control the operation (e.g., coexistence) in which the Wi-Fi communication circuit 520 operates simultaneously with the UWB communication circuit 530.

According to various embodiments, the Wi-Fi service manager 511 and the UWB service manager 513 may exchange information through a service interface and/or a software interface. For example, the Wi-Fi service manager 511 and the UWB service manager 513 may add a function to at least one of a source file for a Wi-Fi service and a source file for a UWB service or exchange information in the manner to invoke a specific service. According to various embodiments, the Wi-Fi communication circuit 520 and the UWB communication circuit 530 may transmit/receive information between devices through a GPIO connection. For example, the UWB communication circuit 530 may transfer information, such as a 'High' or 'Low' status, to the Wi-Fi communication circuit 520 through a first GPIO. For example, the Wi-Fi communication circuit 520 may transfer information, such as a 'High' or 'Low' status, to the UWB communication circuit 530 through a second GPIO.

According to various embodiments, the Wi-Fi communication circuit 520 and the UWB communication circuit 530 may transmit/receive information between devices through a universal asynchronous receiver-transmitter (UART) connection. For example, when the Tx port of the Wi-Fi communication circuit 520 and the Rx port of the UWB communication circuit 530 are connected, the Wi-Fi communication circuit 520 may transmit information and/or data to the UWB communication circuit 530. For example, when the Tx port of the UWB communication circuit 530 and the Rx port of the Wi-Fi communication circuit 520 are connected, the UWB communication circuit 530 may transmit information and/or data to the Wi-Fi communication circuit 520. According to various embodiments, the UART connection between the Wi-Fi communication circuit 520 and the UWB communication circuit 530 may be connected for the purpose of additional information transmission/reception. The UART connection between the Wi-Fi communication circuit 520 and the UWB communication circuit 530 may be omitted.

According to various embodiments, the antenna switch module 560 may be implemented as a single-pole double-throw (SPDT) switch to allow all or some antennas (e.g., the whole or part of the first antenna group 540) connected with the Wi-Fi communication circuit 520 to be used by the UWB communication circuit 530. According to various embodiments, the Wi-Fi service manager 511 may determine whether Wi-Fi communication and UWB communication are simultaneously performed and may determine to allow or reject use of all or some antennas (e.g., the whole or part of the first antenna group 540) connected with the Wi-Fi communication circuit 520 by the UWB communication circuit 530.

According to some embodiments, when the UWB communication circuit 530 is a host, the antenna switch module 560 may be connected with the UWB communication circuit 530, and the UWB service manager 513 may determine to allow or reject use of all or some antennas (e.g., the whole or part of the second antenna group 550) connected with the UWB communication circuit 530 by the Wi-Fi communication circuit 520.

Figure 6:
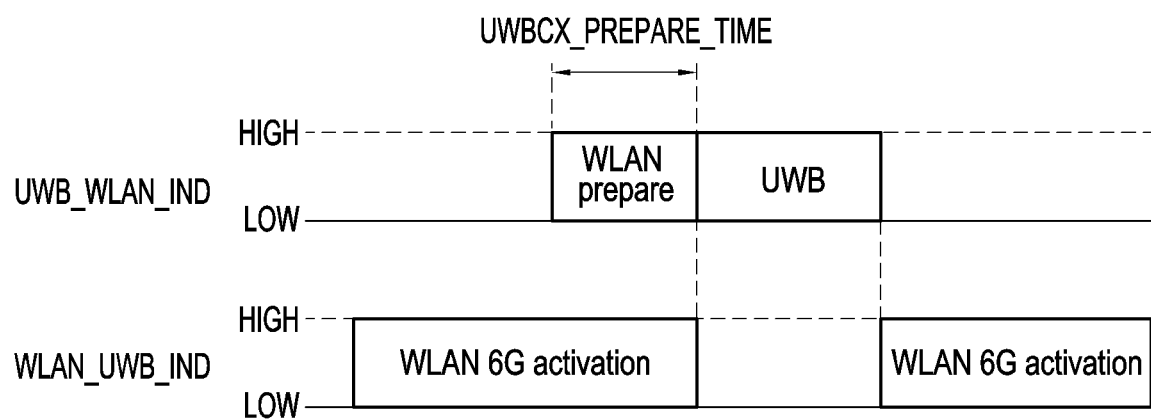
FIG. 6 is a view illustrating an example of transmitting/receiving a signal between a Wi-Fi communication circuit and a UWB communication circuit included in an electronic device, according to various embodiments of the disclosure.

FIG. 6 is a view illustrating an example of transmitting/receiving a signal between a Wi-Fi communication circuit and a UWB communication circuit included in an electronic device, according to various embodiments of the disclosure.

Referring to FIG. 6, according to various embodiments, a Wi-Fi communication circuit (e.g., the Wi-Fi communication circuit 520 of FIGS. 5A and 5B) may be connected with a UWB communication circuit (e.g., the UWB communication circuit 530 of FIG. 5) to transmit a second signal (e.g., WLAN_UWB_IND) to the UWB communication circuit. For example, the second signal may indicate whether the Wi-Fi communication circuit uses a specific frequency band (e.g., 6 GHz). According to various embodiments, the Wi-Fi communication circuit may change the second signal (e.g., signal strength) to a 'high' status to activate (or use) the specific frequency band (e.g., 6 GHz) and transmit it to the UWB communication circuit. According to various embodiments, the Wi-Fi communication circuit may change the second signal (e.g., signal strength) to a 'low (e.g., a ground potential) status to deactivate the specific frequency band (e.g., 6 GHz) and transmit it to the UWB communication circuit.

According to various embodiments, the UWB communication circuit may be electrically connected with the Wi-Fi communication circuit to transmit a first signal (e.g., UWB_WLAN_IND) to the Wi-Fi communication circuit. For example, the first signal may indicate whether the UWB communication circuit prepares to occupy or occupies the specific frequency band (e.g., 6 GHz). According to various embodiments, when both the first signal (e.g., UWB_WLAN_IND) and the second signal (e.g., WLAN_UWB_IND) are in the 'high' status, the UWB communication circuit may prepare to occupy the specific frequency band (e.g., 6 GHz) ("WLAN prepare"), and the Wi-Fi communication circuit may perform Wi-Fi communication using the frequency band. According to various embodiments, when the first signal (e.g., UWB_WLAN_IND) is in the 'high' status, and the second signal (e.g., WLAN_UWB_IND) is in the low (e.g., ground)' status, the UWB communication circuit (530 of FIG. 5) may occupy the specific frequency band (e.g., 6 GHz) and perform UWB communication.

Figure 7:
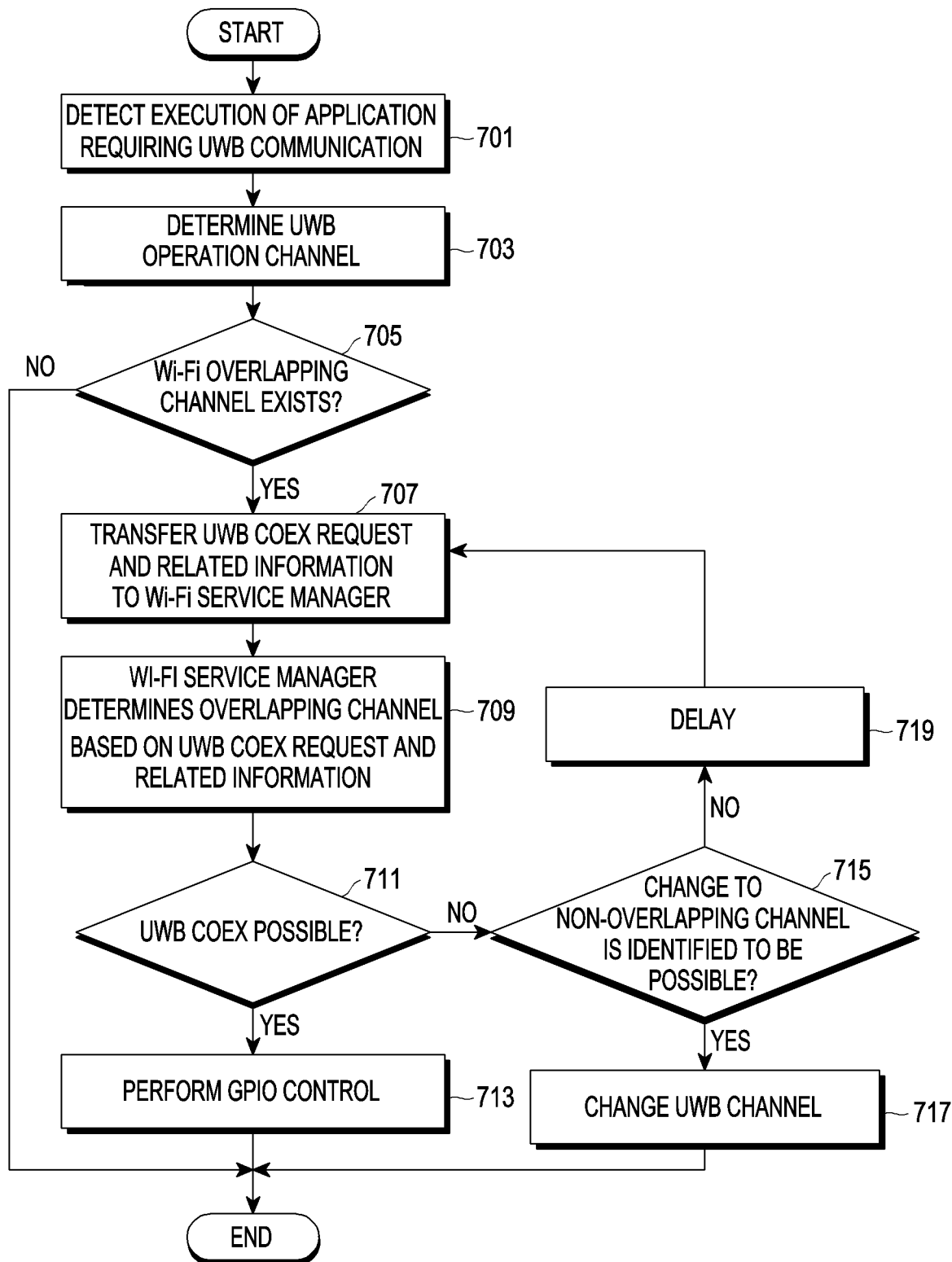
FIG. 7 is a view illustrating an example of an operation in which an electronic device may simultaneously perform Wi-Fi communication and UWB communication, according to various embodiments of the disclosure.

FIG. 7 is a view illustrating an operation in which an electronic device may simultaneously perform Wi-Fi communication and UWB communication, according to various embodiments of the disclosure.

Operations 701 to 719 of FIG. 7 may be performed by the UWB service manager (e.g., the UWB service manager 513 of FIGS. 5A and 5B) and/or the Wi-Fi service manager (e.g., the Wi-Fi service manager 511 of FIGS. 5A and 5B) included in the electronic device (e.g., the electronic device 101 of FIGS. 1, 5A, and 5B) or by a processor (e.g., the processor 120 of FIG. 1 or the application processor 510 of FIGS. 5A and 5B) including the UWB service manager and/or the Wi-Fi service manager.

Referring to FIG. 7, in operation 701, the electronic device (e.g., the electronic device 101 of FIGS. 1 and 5) may detect execution of an application using UWB communication through the UWB service manager (e.g., the UWB service manager 513 of FIG. 5). As an example, UWB communication may be used in applications requiring precise positioning, short-range communication for providing a short-range service, and/or automatic lock/unlock service for car key or door lock based on the user's location. According to various embodiments, the UWB service manager may detect execution of an application requiring communication through the UWB communication circuit and perform an operation associated therewith.

In operation 703, the UWB service manager may determine an operation channel of the UWB communication circuit upon detecting execution of the application requiring communication through the UWB communication circuit. According to various embodiments, the UWB service manager may determine the operation channel of the UWB communication circuit based on the regulation of each country or the required accuracy of UWB precise position measurement. For example, since operation channel 5 for UWB communication is lower in center frequency than operation channel 9 for UWB communication, signal quality against path loss according to distance may be relatively good, and operation channel 5 for UWB communication may be higher in measurement precision than operation channel 9 for UWB communication. For example, in a specific country, use of the frequency band of operation channel 5 for UWB communication may be prohibited, and the UWB service manager may determine operation channel 9 for UWB communication as the operation channel. For example, the UWB service manager may determine any one UWB channel among operation channel 1 to operation channel 9 for UWB communication, as the operation channel, based on various conditions.

In operation 705, the UWB service manager may identify whether the determined UWB channel overlaps the Wi-Fi operation frequency band. For example, the UWB service manager may identify whether the UWB channel is one of channel 5, 6, 7, or 8. According to various embodiments, when the operation channel for UWB communication is determined as channel 5, the UWB channel may overlap channel 29 to channel 189 among the Wi-Fi 6 GHz channels.

According to various embodiments, the Wi-Fi signal and the UWB signal may interfere with each other, so that the error rate may be significantly increased in UWB distance measurement or short-range communication, and an application requiring precise positioning may fail to obtain a precise result.

According to various embodiments, when the UWB operation channel and the Wi-Fi channel overlap (Yes in operation 705), the UWB service manager may request the Wi-Fi service manager (e.g., the Wi-Fi service manager 511 of FIG. 5) to perform the operation of simultaneous use (hereinafter, referred to as 'coexistence' for ease of description) on the channel between UWB communication and Wi-Fi communication in operation 707. According to various embodiments, when the UWB service manager requests the coexistence operation, the UWB service manager may transfer coexistence request information for Wi-Fi communication and UWB communication to the Wi-Fi service manager. According to various embodiments, when the UWB service manager requests the coexistence request, the UWB service manager may transfer at least one or more of UWB channel information, UWB communication operation period information, and/or UWB communication operation duration information, along with it, to the Wi-Fi service manager. For example, the UWB channel information may be one of operation channel 5, 6, 7, or 8 for UWB communication. For example, the operation period of the UWB communication and the operation duration of the UWB communication may be values (e.g., a 100 ms period and a 20 ms duration) set in an application, such as of precise position measurement. According to an embodiment, when the UWB operation channel and the Wi-Fi channel do not overlap (No in operation 705), operation 707 and its subsequent operations may not be performed. For example, when the UWB operating channel is one of no. 1, 2, 3, 4, or 9, it may be determined that the UWB operation channel and the Wi-Fi channel do not overlap.

In operation 709, the Wi-Fi service manager may determine an overlapping channel of the Wi-Fi channel based on the coexistence request information for the Wi-Fi communication and the UWB communication obtained from the UWB service manager and related information. For example, if the UWB operation channel is no. 5, the Wi-Fi communication circuit may determine all the channels between channels 29 and 189 as overlapping channels. As another example, the overlapping channel of the Wi-Fi communication circuit may be determined as some channels between no. 29 and no. 189 based on an error rate during simultaneous operation. For example, the Wi-Fi communication circuit 520 may determine all the channels between no. 65 and no. 189 as the overlapping channels through a method that allows some interference based on an allowable UWB error rate.

As another example, if the UWB operation channel is no. 6, the Wi-Fi communication circuit may determine all or some of the channels between channels 129 and 233 as overlapping channels.

As another example, if the UWB operation channel is no. 7, the Wi-Fi communication circuit may determine all the 6 GHz channels as overlapping channels.

In operation 711, the Wi-Fi service manager may determine whether to allow the coexistence operation between Wi-Fi and UWB communication based on the type of the Wi-Fi application being currently operated, the Wi-Fi operation channel, and/or the Wi-Fi traffic pattern, based on the determined overlapping channel. For example, if the operation duration of the UWB communication circuit exceeds a time according to a low latency condition under the assumption that an application requiring a low latency of voice of Wi-Fi (VoWiFi), video calls, or real-time streaming is running, and the low-latency condition is, e.g., 20 ms or less, the Wi-Fi service manager may determine that it is difficult to provide the user with a low-latency service on the VoWiFi application and may not allow the coexistence operation with the UWB communication circuit. As another example, when real-time data (e.g., user datagram protocol (UDP) packet) is subjected to Wi-Fi communication in a shorter period than the operation duration of the UWB communication circuit as a result of identifying the Wi-Fi traffic pattern, the Wi-Fi service manager may not allow the coexistence operation with the UWB communication circuit. According to an embodiment, the Wi-Fi service manager may transfer information including the result of determining whether the UWB coexistence is possible to the UWB service manager.

When the Wi-Fi service manager allows UWB coexistence (Yes in operation 711) in operation 711, the Wi-Fi communication circuit (e.g., the Wi-Fi communication circuit 520 of FIG. 5) and the UWB communication circuit (e.g., the UWB communication circuit 530 of FIG. 5) may perform the coexistence operation using GPIO PIN control in operation 713. For example, the UWB communication circuit may transfer information regarding the UWB communication circuit to the Wi-Fi communication circuit through the first GPIO, with it in the 'High' or 'Low' status. For example, the Wi-Fi communication circuit may transfer information regarding the Wi-Fi communication circuit to the UWB communication circuit through the second GPIO, with it in the 'High' or 'Low' status.

According to various embodiments, when the Wi-Fi communication circuit operates on the overlapping channel, the second GPIO connected from the Wi-Fi communication circuit to the UWB communication circuit may be set to the 'high' state, and transmission/reception may be performed. According to various embodiments, when the Wi-Fi communication circuit does not operate on the overlapping channel, the second GPIO may be set to the 'low' status. According to various embodiments, when the UWB communication circuit operates on the overlapping channel, the first GPIO connected from the UWB communication circuit to the Wi-Fi communication circuit may be set to the 'high' status, and transmission/reception may be performed. According to various embodiments, when the UWB communication circuit does not operate on the overlapping channel, the first GPIO may be set to the 'low' status. According to various embodiments, when the Wi-Fi service manager allows the UWB coexistence operation, a priority may be set for UWB communication. For example, when the first GPIO is set to the 'high' status in the UWB communication circuit, the Wi-Fi communication circuit may change the second GPIO to the 'low' state in a set time ('PREPARE TIME') and may stop transmission or reception on the overlapping channel. Further, the UWB communication circuit may change the first GPIO to the 'low' status after the PREPARE TIME and the UWB operation duration to hand over the right so that the Wi-Fi communication circuit may occupy the overlapping channel.

If the Wi-Fi service manager does not allow UWB coexistence in operation 711 (No in operation 711), the UWB service manager may identify whether the UWB application may be used using a non-overlapping channel in operation 715. For example, if UWB channel 5 has been determined to be used, but it is rejected by the Wi-Fi service manager, the UWB service manager may determine whether executing the UWB application using UWB channel 9 causes any issue. When the UWB channel may be changed in operation 715 (Yes in operation 715), the UWB service manager may change the UWB channel to a non-overlapping channel and drive the UWB communication circuit in operation 717. If it is identified in operation 715 that it is impossible to change the UWB channel (No in operation 715), the UWB service manager may again transfer a UWB coexistence request and related information to the Wi-Fi service manager after a predetermined delay in operation 719.

Figure 8:
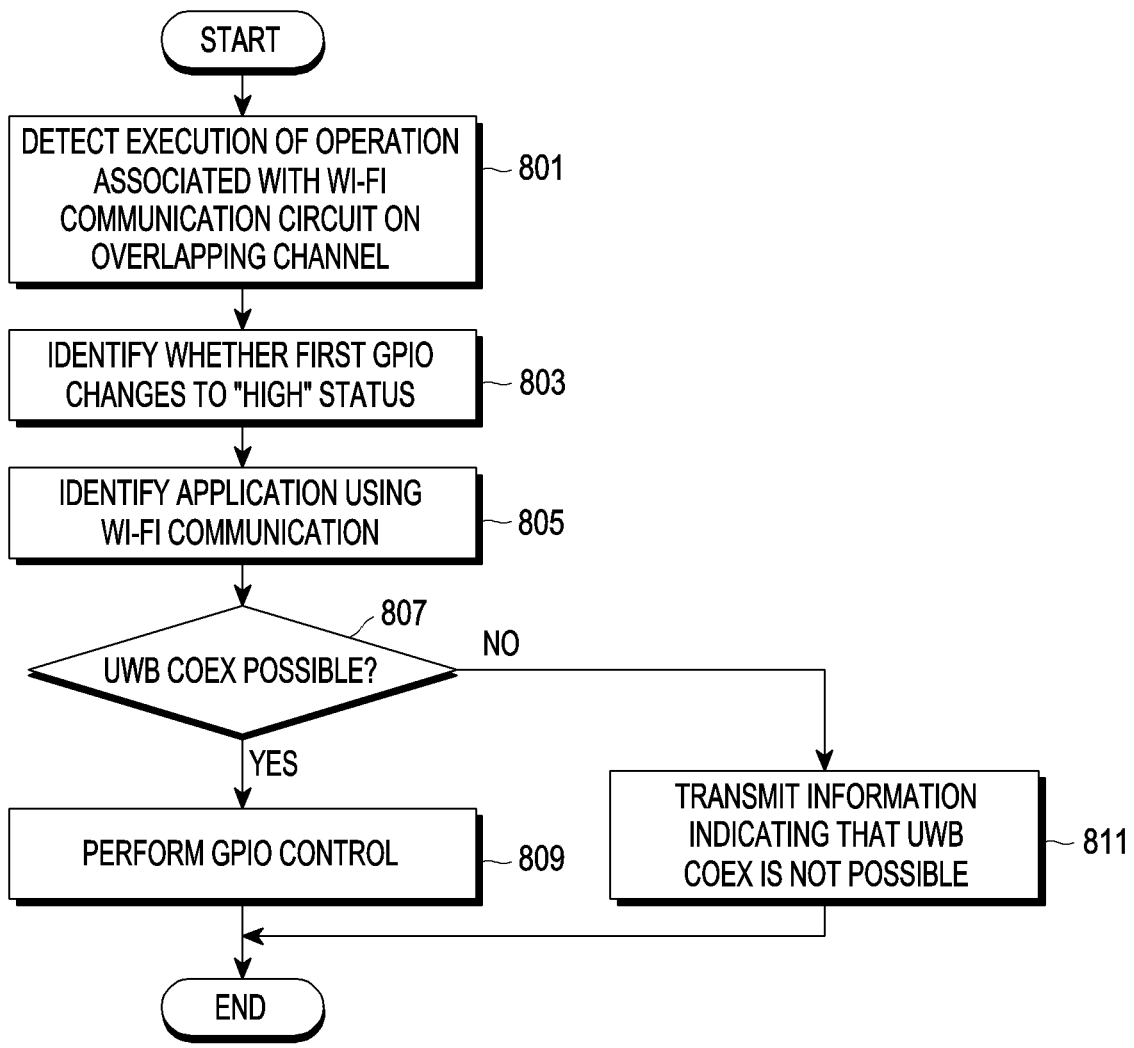
FIG. 8 is a view illustrating an example of an operation in which an electronic device may simultaneously perform Wi-Fi communication and UWB communication, according to various embodiments of the disclosure.

FIG. 8 is a view illustrating another example of an operation in which an electronic device may simultaneously perform Wi-Fi communication and UWB communication according to various embodiments of the disclosure.

Operations 801 to 813 of FIG. 8 may be performed by the UWB service manager (e.g., the UWB service manager 513 of FIGS. 5A and 5B) and/or the Wi-Fi service manager (e.g., the Wi-Fi service manager 511 of FIGS. 5A and 5B) included in the electronic device (e.g., the electronic device 101 of FIGS. 1, 5A, and 5B) or by a processor (e.g., the processor 120 of FIG. 1 or the application processor 510 of FIGS. 5A and 5B) including the UWB service manager and/or the Wi-Fi service manager.

FIG. 8 is a flowchart illustrating a method in which a Wi-Fi communication circuit (e.g., the Wi-Fi communication circuit 520 of FIG. 5) detects execution of a function associated with an overlapping channel and performs a coexistence operation with a UWB communication circuit when the UWB communication circuit (e.g., the UWB communication circuit 530 of FIG. 5) is operating on the overlapping channel.

Referring to FIG. 8, in operation 801, the Wi-Fi service manager (e.g., the Wi-Fi service manager 511 of FIG. 5) may detect execution of an application associated with the Wi-Fi communication circuit and driving of the communication circuit on an overlapping channel. Upon detecting an operation associated with the Wi-Fi communication circuit on the overlapping channel in a Wi-Fi service in operation 801, the Wi-Fi service manager may identify whether the first GPIO connected from the UWB communication circuit to the Wi-Fi communication circuit is triggered to the "high" status in operation 803. For example, the Wi-Fi service manager may identify whether the first GPIO is triggered to the "high" status for a designated time. If there is an occasion where the first GPIO is triggered to the "high" status, the Wi-Fi service manager may determine that the UWB communication circuit is operating on the overlapping channel.

According to various embodiments, when the UWB communication circuit is driven on the overlapping channel, the Wi-Fi service manager may identify the type of the application using the Wi-Fi communication circuit and/or the traffic pattern in operation 805. For example, when an application requiring low latency, such as VoWiFi, video calls, or real-time streaming, the Wi-Fi service manager may identify the latency requirement of the application. For example, the Wi-Fi service manager may identify the Wi-Fi traffic pattern and identify the period of the real-time data (e.g., UDP packets).

In operation 807, the Wi-Fi service manager may determine whether Wi-Fi communication and UWB communication coexist, in the same manner as the method described in connection with FIG. 4, based on the Wi-Fi traffic pattern or the latency requirement of the application. When it is determined in operation 807 that Wi-Fi communication and UWB communication is able to coexist (Yes in operation 807), the Wi-Fi communication circuit and the UWB communication circuit may perform the coexistence operation between Wi-Fi communication and UWB communication using GPIO PIN control in operation 809.

When it is determined in operation 807 that Wi-Fi communication and UWB communication may not coexist (No in operation 807), the Wi-Fi service manager may transmit information indicating that UWB coexistence is impossible to the UWB service manager (e.g., the UWB service manager 513 of FIG. 5), may not perform GPIO control and, upon transmission/reception using the Wi-Fi communication circuit, perform communication without UWB coexistence operation in operation 811. According to various embodiments, the UWB service manager notified of pause of the UWB coexistence operation may perform a channel change or continue the operation of the UWB communication circuit on the corresponding channel. According to various embodiments, when the operation of the UWB communication circuit is performed without a channel change, the error rate due to the operation of the UWB communication circuit may increase. However, it is possible to provide a service related to measurement of the user's position using only the resultant value for the case where measurement on the application is successful, such as position measurement.

Figure 9:
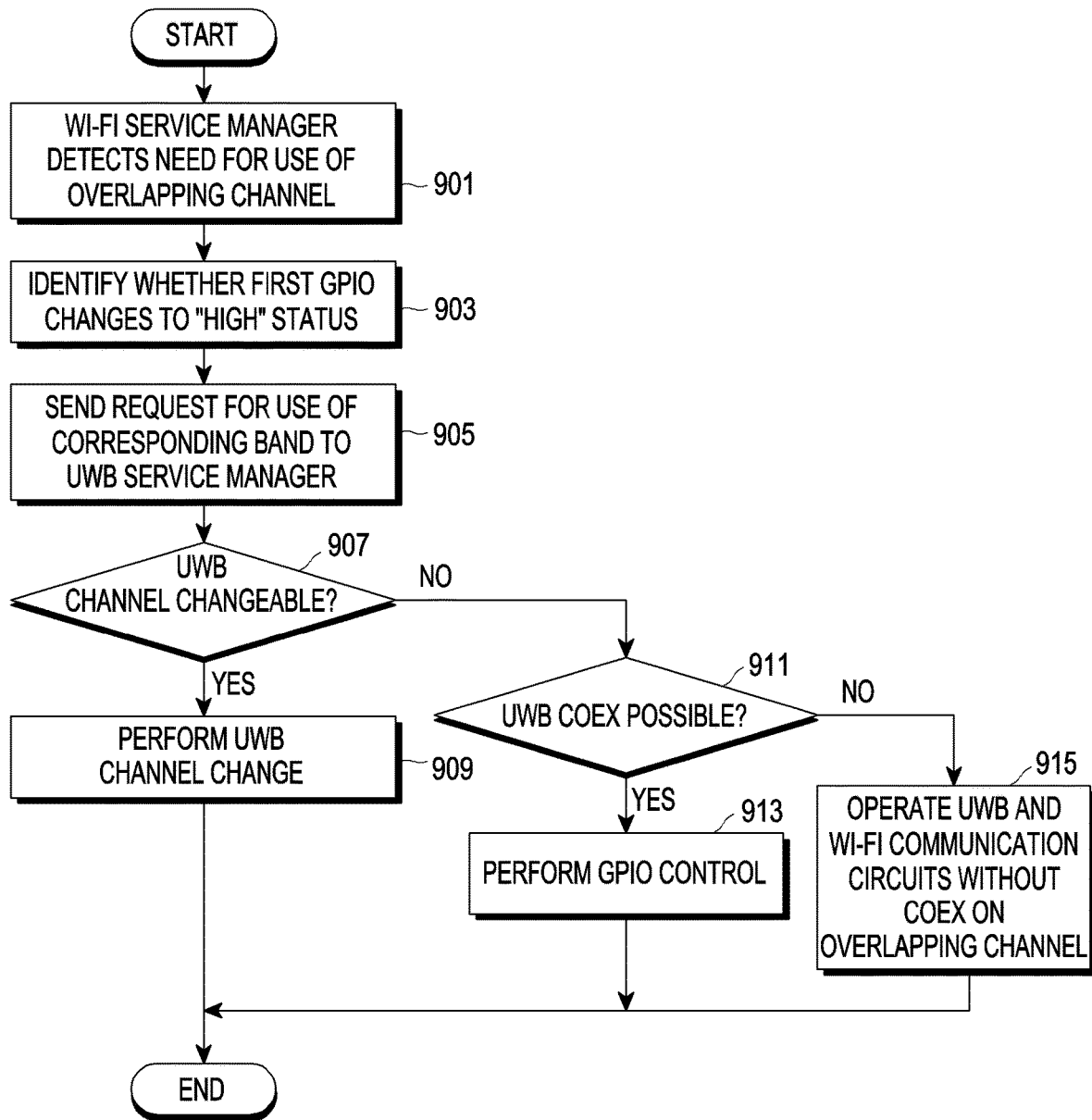
FIG. 9 is a view illustrating an example of an operation in which an electronic device may simultaneously perform Wi-Fi communication and UWB communication, according to various embodiments of the disclosure.
Figure 10:
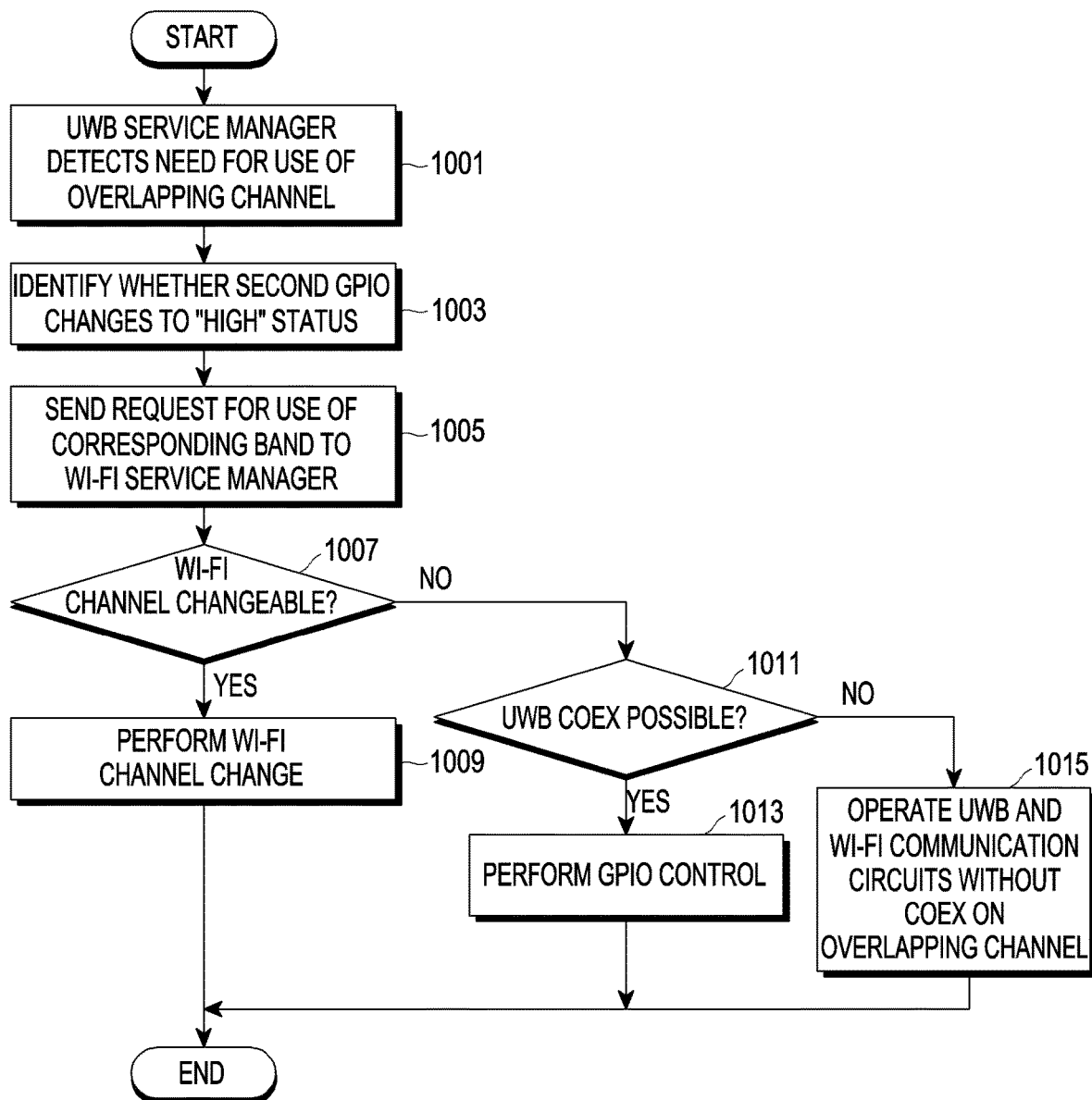
FIG. 10 is a view illustrating an example of an operation in which an electronic device may simultaneously perform Wi-Fi communication and UWB communication, according to various embodiments of the disclosure.

FIGS. 9 and 10 are views illustrating another example of an operation in which an electronic device simultaneously performs Wi-Fi communication and UWB communication according to various embodiments of the disclosure.

FIGS. 9 and 10 illustrate an example method in which the Wi-Fi service manager and the UWB service manager determine to use a corresponding band through negotiation when the Wi-Fi communication circuit (e.g., the Wi-Fi communication circuit 520 of FIG. 5) and the UWB communication circuit (e.g., the UWB communication circuit 530 of FIG. 5) use the same band.

Operations 901 to 915 of FIG. 9 may be performed by the UWB service manager (e.g., the UWB service manager 513 of FIGS. 5A and 5B) and/or the Wi-Fi service manager (e.g., the Wi-Fi service manager 511 of FIGS. 5A and 5B) included in the electronic device (e.g., the electronic device 101 of FIGS. 1, 5A, and 5B) or by a processor (e.g., the processor 120 of FIG. 1 or the application processor 510 of FIGS. 5A and 5B) including the UWB service manager and/or the Wi-Fi service manager.

Referring to FIG. 9, in operation 901, the Wi-Fi service manager (e.g., the Wi-Fi service manager 511 of FIG. 5) may detect the need to use an overlapping channel. In operation 903, the Wi-Fi service manager may detect whether there is an occasion where the first GPIO value connected from the UWB communication circuit to the Wi-Fi communication circuit is changed to the 'high' status. According to various embodiments, the Wi-Fi service manager may monitor the first GPIO value to identify whether the UWB communication circuit uses the overlapping channel. In operation 905, when the Wi-Fi communication circuit needs to use the corresponding band, the Wi-Fi service manager may send a request for using the band to the UWB service manager. For example, when the Wi-Fi service manager needs to use the overlapping channel for the Wi-Fi service, the Wi-Fi service manager may send a request for using the overlapping channel to the UWB service manager.

In operation 907, the UWB service manager may identify whether a UWB channel change is possible based on the request for using the overlapping channel from the Wi-Fi service manager. For example, the UWB service manager may determine whether a UWB channel change is possible and may transfer information including the result of the determination to the Wi-Fi service manager. If a UWB channel change is possible in operation 907, the UWB service manager may change the UWB channel in operation 909. According to various embodiments, the UWB communication circuit may stop using the band and notify the Wi-Fi service manager of it. For example, the UWB communication circuit may change the UWB communication band from the overlapping channel to a non-overlapping channel. If a UWB channel change is impossible in operation 907, the UWB service manager and/or the Wi-Fi service manager may determine whether Wi-Fi communication and UWB communication may coexist in operation 911. If it is determined in operation 911 that Wi-Fi communication and UWB communication may coexist (Yes in operation 911), the UWB service manager and/or the Wi-Fi service manager may perform GPIO control in operation 913. If it is determined in operation 911 that Wi-Fi communication and UWB communication may not coexist (No in operation 911), the UWB communication circuit and/or the Wi-Fi communication circuit may perform communication without UWB coexistence on the overlapping channel in operation 915.

FIG. 10 is a view illustrating another example of an operation in which an electronic device simultaneously performs Wi-Fi communication and UWB communication according to various embodiments of the disclosure.

Operations 1001 to 1015 of FIG. 10 may be performed by the UWB service manager (e.g., the UWB service manager 513 of FIGS. 5A and 5B) and/or the Wi-Fi service manager (e.g., the Wi-Fi service manager 511 of FIGS. 5A and 5B) included in the electronic device (e.g., the electronic device 101 of FIGS. 1, 5A, and 5B) or by a processor (e.g., the processor 120 of FIG. 1 or the application processor 510 of FIGS. 5A and 5B) including the UWB service manager and/or the Wi-Fi service manager.

Referring to FIG. 10, in operation 1001, the UWB service manager (e.g., the UWB service manager 513 of FIG. 5) may detect the need to use an overlapping channel. In operation 1003, the UWB service manager may detect whether there is an occasion where the second GPIO value connected from the Wi-Fi communication circuit to the UWB communication circuit is changed to the 'high' status. According to various embodiments, the UWB service manager may monitor the second GPIO value to identify whether the Wi-Fi communication circuit uses the overlapping band. In operation 1005, when the UWB communication circuit needs to use the band, the UWB service manager 513 may send a request for using the band to the Wi-Fi service manager (e.g., the Wi-Fi service manager 511 of FIG. 5).

In operation 1007, the Wi-Fi service manager may identify whether a Wi-Fi channel change is possible based on the request for using the overlapping channel received from the UWB service manager. According to an embodiment, the Wi-Fi service manager may identify whether a Wi-Fi channel change is possible and transmit information including the result of the identification to the UWB service manager. If a Wi-Fi channel change is possible in operation 1007, the Wi-Fi service manager may change the Wi-Fi channel in operation 1009. According to various embodiments, the Wi-Fi communication circuit may stop using the band and notify the UWB service manager of it. For example, the Wi-Fi communication circuit may change the Wi-Fi communication band from the 6 GHz band to a 5 GHz band. If a Wi-Fi channel change is impossible in operation 1007, the UWB service manager and/or the Wi-Fi service manager may determine whether Wi-Fi communication and UWB communication may coexist in operation 1011. If it is determined in operation 1011 that Wi-Fi communication and UWB communication may coexist (Yes in operation 1011), the UWB service manager and/or the Wi-Fi service manager may perform GPIO control in operation 1013. If it is determined in operation 1011 that Wi-Fi communication and UWB communication may not coexist (No in operation 1011), the UWB communication circuit and/or the Wi-Fi communication circuit may perform communication without UWB coexistence on the overlapping channel in operation 1015.

Figure 11A:
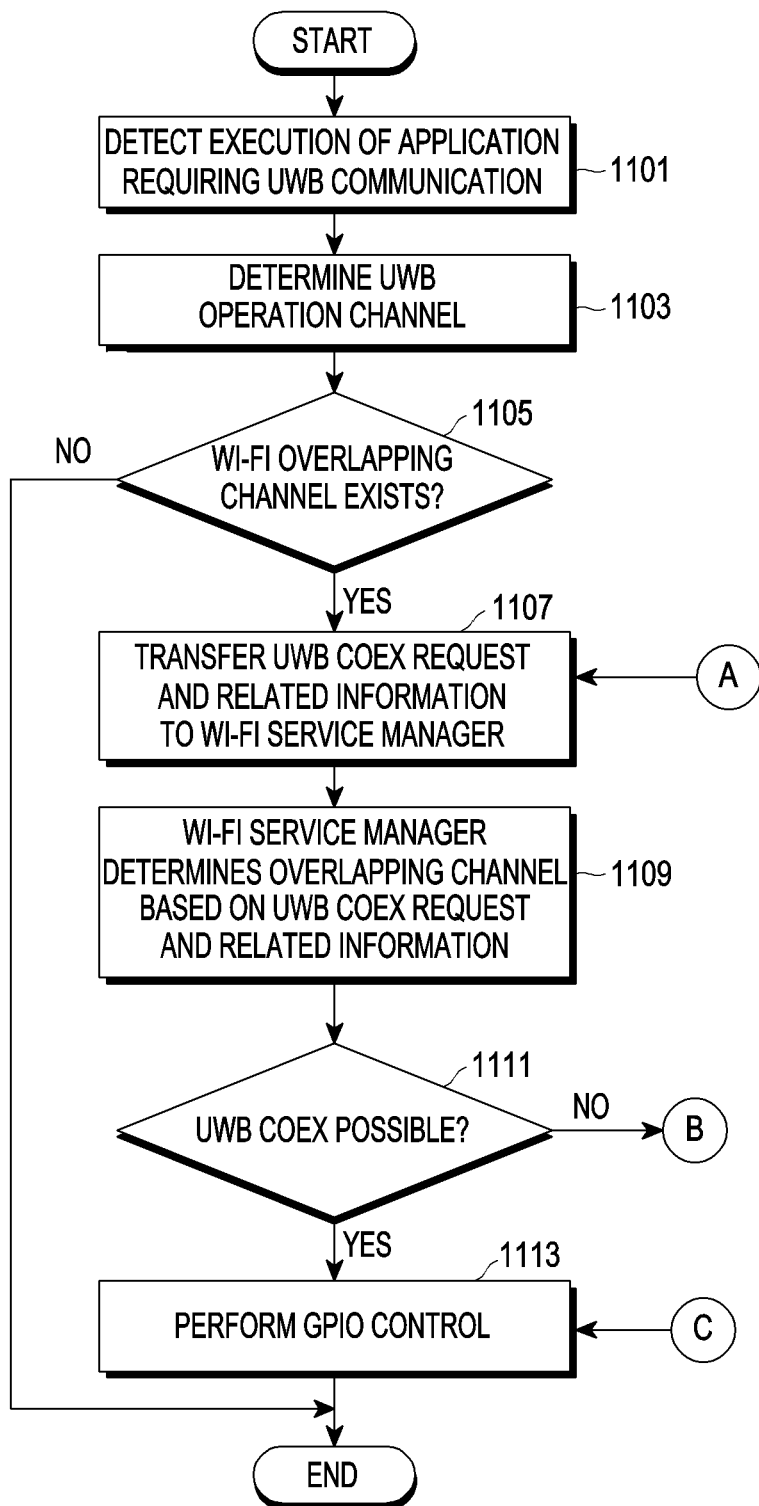
FIG. 11A is a view illustrating an example of an operation in which an electronic device may determine a priority and may simultaneously perform Wi-Fi communication and UWB communication, according to various embodiments of the disclosure.
Figure 11B:
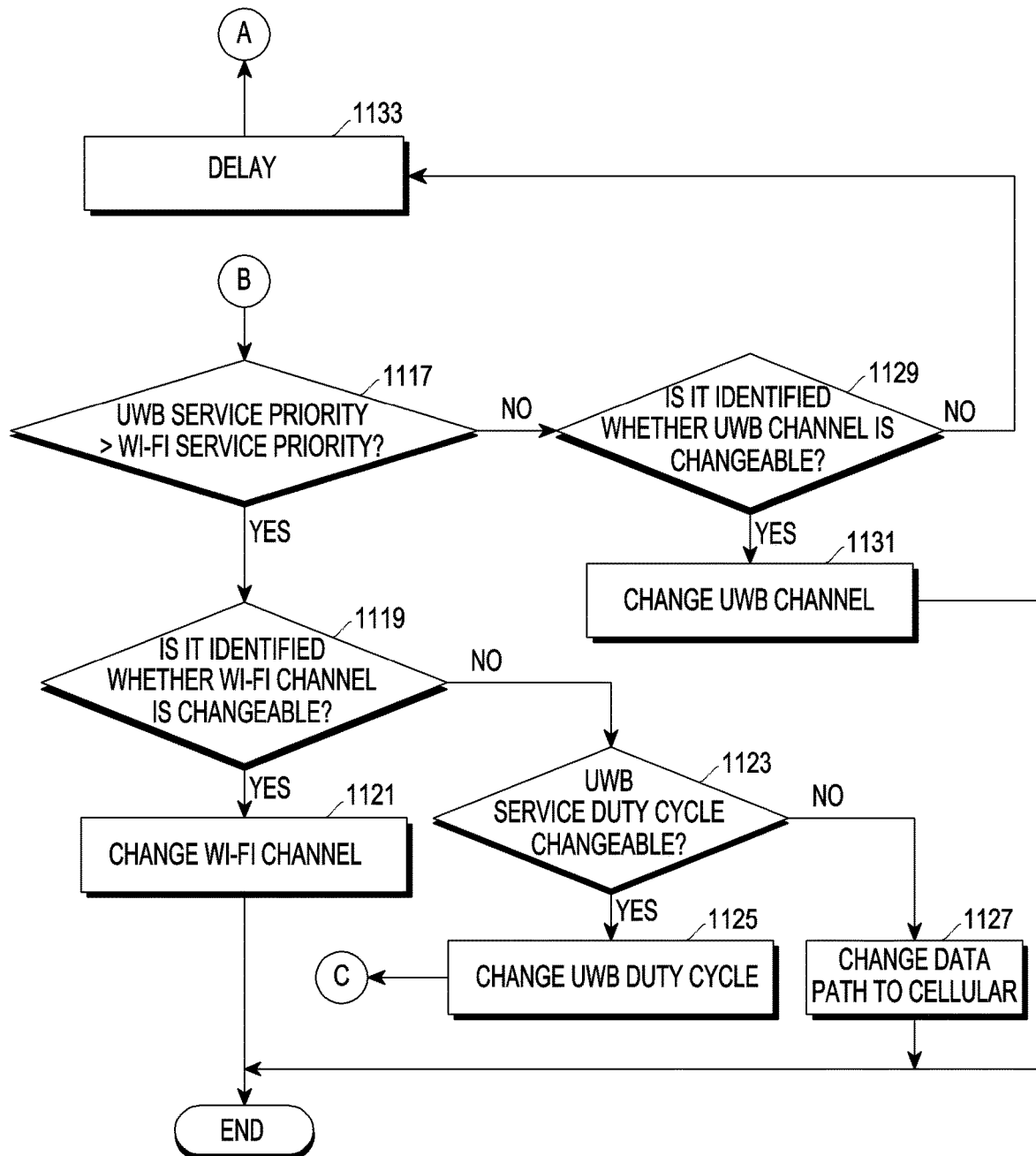
FIG. 11B is a view illustrating an example of an operation in which an electronic device determines priority and simultaneously performs Wi-Fi communication and UWB communication, according to various embodiments of the disclosure.

FIGS. 11A and 11B are views illustrating examples of an operation in which an electronic device may determines a priority and may simultaneously perform Wi-Fi communication and UWB communication, according to various embodiments of the disclosure.

Operations 1101 to 1131 of FIGS. 11A and 11B may be performed by the UWB service manager (e.g., the UWB service manager 513 of FIGS. 5A and 5B) and/or the Wi-Fi service manager (e.g., the Wi-Fi service manager 511 of FIGS. 5A and 5B) included in the electronic device (e.g., the electronic device 101 of FIGS. 1, 5A, and 5B) or by a processor (e.g., the processor 120 of FIG. 1 or the application processor 510 of FIGS. 5A and 5B) including the UWB service manager and/or the Wi-Fi service manager.

Referring to FIG. 11A, in operation 1101, the electronic device (e.g., the electronic device 101 of FIG. 1 or 5) may detect execution of an application using UWB communication through the UWB service manager (e.g., the UWB service manager 513 of FIG. 5). According to various embodiments, the UWB service manager may detect execution of an application requiring communication through the UWB communication circuit (e.g., the UWB communication circuit 530 of FIG. 5) and perform an operation associated therewith. In operation 1103, the UWB service manager may determine an operation channel of the UWB communication circuit upon detecting execution of the application requiring communication through the UWB communication circuit. According to various embodiments, the UWB service manager may determine the operation channel of the UWB communication circuit based on the regulation of each country or the required accuracy of UWB precise position measurement. In operation 1105, the UWB service manager may identify whether the determined UWB channel overlaps the Wi-Fi operation frequency band.

When the determined UWB operation channel and the Wi-Fi channel overlap, the UWB service manager may send a request for the coexistence operation between UWB communication and Wi-Fi communication to the Wi-Fi service manager (e.g., the Wi-Fi service manager 511 of FIG. 5) in operation 1107. According to various embodiments, when the UWB service manager requests the coexistence operation, the UWB service manager may transfer coexistence request information for Wi-Fi communication and UWB communication to the Wi-Fi service manager (e.g., the Wi-Fi service manager 511 of FIG. 5). According to various embodiments, when the UWB service manager requests the coexistence request, the UWB service manager may transfer at least one or more of UWB channel information, UWB communication operation period information, or UWB communication operation duration information, along with it, to the Wi-Fi service manager. In operation 1109, the Wi-Fi service manager may determine an overlapping channel of the Wi-Fi channel based on the coexistence request information for the Wi-Fi communication and the UWB communication obtained from the UWB service manager and related information.

In operation 1111, the Wi-Fi service manager may determine whether the coexistence operation between Wi-Fi communication and UWB communication is possible based on the type of the Wi-Fi application being currently operated, the Wi-Fi operation channel, and/or the Wi-Fi traffic pattern, based on the determined overlapping channel. When it is determined in operation 1111 that Wi-Fi communication and UWB communication is able to coexist (Yes in operation 1111), the Wi-Fi communication circuit and the UWB communication circuit may perform the coexistence operation using GPIO PIN control in operation 1113. If it is determined in operation 1111 that Wi-Fi communication and UWB communication may not coexist, the UWB service manager and/or the Wi-Fi service manager may determine priority between the UWB service and the Wi-Fi service in operation 1115.

According to various embodiments, the UWB service manager and/or the Wi-Fi service manager may previously determine (or set) priority between the UWB service and the Wi-Fi service. For example, the priority of a UWB car key service (a service to open the car door within a certain distance) or a UWB door lock service (a service to open the door within a certain distance) may be set to '0'. For example, the priority of Wi-Fi call, video streaming, and real-time game may be set to '1'. For example, the priority of the UWB find device service (a service to locate a specific device) may be set to '2'. For example, the priority of other services than the above-described services may be set to '3'. Based on the set priorities, the UWB service manager and/or the Wi-Fi service manager may compare the priorities of the UWB service and the Wi-Fi service. According to various embodiments, when the priority of the UWB service is higher, the Wi-Fi service manager may identify whether it is possible to change the Wi-Fi channel. According to various embodiments, if Wi-Fi roaming to a channel not overlapping UWB is possible, the Wi-Fi service manager may change the Wi-Fi channel for roaming.

If the priority of the UWB service is higher than the priority of the Wi-Fi service in operation 1115 (Yes in operation 1115), the Wi-Fi service manager may identify whether a channel change is possible within the Wi-Fi frequency band in operation 1117. If a Wi-Fi channel change is possible in operation 1117 (Yes in operation 1117), the Wi-Fi service manager may change the use channel in the Wi-Fi frequency band in operation 1119. If a Wi-Fi channel change is impossible in operation 1117 (No in operation 1117), the UWB service manager may identify whether the UWB service duty cycle is changeable in operation 1121. If the UWB service duty cycle is changeable in operation 1121 (Yes in operation 1121), the UWB service manager may change the UWB service duty cycle in operation 1123. If the UWB service duty cycle is not changeable in operation 1121 (No in operation 1121), the UWB service manager may change the data path to cellular in operation 1125.

If the priority of the UWB service is not higher than the priority of the Wi-Fi service in operation 1115 (No in operation 1115), the UWB service manager may identify whether the UWB channel is changeable in operation 1127. If the UWB channel is changeable in operation 1127 (Yes in operation 1127), the UWB service manager may change the UWB channel in operation 1129. If the UWB channel is not changeable in operation 1127 (No in operation 1127), the UWB service manager may again transfer a UWB coexistence request and related information to the Wi-Fi service manager after a predetermined delay in operation 1131.

According to any one of various embodiments, an electronic device (e.g., the electronic device 101 of FIG. 1 or 5) may comprise a UWB communication circuit (e.g., the UWB communication circuit 530 of FIG. 5), a Wi-Fi communication circuit (e.g., the Wi-Fi communication circuit 520 of FIG. 5), and a processor (e.g., the processor 120 of FIG. 1 or the application processor 510 of FIG. 5) controlling the UWB communication circuit and the Wi-Fi communication circuit. The processor may identify an operation channel of the UWB communication circuit, identify a communication band of the Wi-Fi communication circuit, overlapping the operation channel of the UWB communication circuit, and when the communication band overlapping the operation channel is activated, determine whether to simultaneously perform Wi-Fi communication through the activated communication band and UWB communication through the operation channel.

According to various embodiments, the processor may be configured to include a UWB service manager (e.g., the UWB service manager 513 of FIG. 5) controlling the UWB communication circuit and a Wi-Fi service manager (e.g., the Wi-Fi service manager 511 of FIG. 5) controlling the Wi-Fi communication circuit. According to various embodiments, the Wi-Fi service manager may receive first information related to the UWB communication from the UWB service manager, and the Wi-Fi service manager may transmit second information related to the Wi-Fi communication to the UWB service manager.

According to various embodiments, the Wi-Fi service manager may determine whether to simultaneously perform the Wi-Fi communication and the UWB communication based on the first information and the second information. According to various embodiments, the first information may include at least one of the operation channel of the UWB communication, a period of the UWB communication, duration of the UWB communication, or priority information about a service of the UWB communication. According to various embodiments, the second information may include at least one of a traffic pattern of the Wi-Fi communication, a quality of service (QoS) of a service of the Wi-Fi communication, and priority information about the service of the Wi-Fi communication.

According to various embodiments, the UWB communication circuit and the Wi-Fi communication circuit may communicate through GPIO. According to various embodiments, when the communication band of the Wi-Fi communication circuit overlapping the operation channel of the UWB communication circuit is activated, the UWB communication circuit may transmit a first signal, set to a high status, through a first GPIO to the Wi-Fi communication circuit, and the Wi-Fi communication circuit may transmit a second signal, set to a high status, through a second GPIO to the UWB communication circuit.

According to various embodiments, the UWB service manager may receive, from the Wi-Fi service manager, a use request for the communication band overlapping the operation channel. According to various embodiments, the UWB service manager may determine whether the operation channel is changeable and change the operation channel according to a result of the determination. According to various embodiments, the Wi-Fi service manager may receive, from the UWB service manager, a use request for the operation channel overlapping the communication band. According to various embodiments, the Wi-Fi service manager may determine whether the communication band is changeable and change the communication band according to a result of the determination.

According to various embodiments, the Wi-Fi service manager may determine whether to allow the UWB communication through the operation channel. According to various embodiments, if the UWB communication through the operation channel is allowed, the Wi-Fi service manager or the UWB service manager may determine priority between a first service for the UWB communication and a second service for the Wi-Fi communication. According to various embodiments, if a priority of the first service for the UWB communication is higher than a priority for the second service for the Wi-Fi communication, the Wi-Fi service manager may change a Wi-Fi channel. According to various embodiments, if the priority of the first service for the UWB communication is not higher than the priority for the second service for the Wi-Fi communication, the UWB service manager may change the UWB channel.

According to any one of various embodiments, a method for controlling communication of an electronic device (e.g., the electronic device 101 of FIG. 1 or 5) may comprise identifying an operation channel of an ultra-wideband (UWB) communication circuit (e.g., the UWB communication circuit 530 of FIG. 5) included in the electronic device, identifying a communication band of a Wi-Fi communication circuit (e.g., the Wi-Fi communication circuit 520 of FIG. 5) included in the electronic device, overlapping the operation channel of the UWB communication circuit, and when the communication band overlapping the operation channel is activated, determining whether to simultaneously perform Wi-Fi communication through the activated communication band and UWB communication through the operation channel. According to various embodiments, the electronic device may include a UWB service manager (e.g., the UWB service manager 513 of FIG. 5) controlling the UWB communication circuit and a Wi-Fi service manager (e.g., the Wi-Fi service manager 511 of FIG. 5) controlling the Wi-Fi communication circuit.

According to various embodiments, the Wi-Fi service manager may receive first information related to the UWB communication from the UWB service manager, and the Wi-Fi service manager may transmit second information related to the Wi-Fi communication to the UWB service manager. According to various embodiments, the Wi-Fi service manager may determine whether to simultaneously perform the Wi-Fi communication and the UWB communication based on the first information and the second information. According to various embodiments, the first information may include at least one of the operation channel of the UWB communication, a period of the UWB communication, duration of the UWB communication, or priority information about a service of the UWB communication. According to various embodiments, the second information may include at least one of a traffic pattern of the Wi-Fi communication, a QoS of a service of the Wi-Fi communication, and priority information about the service of the Wi-Fi communication.

According to various embodiments, when the communication band of the Wi-Fi communication circuit overlapping the operation channel of the UWB communication circuit, the UWB communication circuit may transmit a first signal, set to a high status, through a first general purpose input and output (GPIO) to the Wi-Fi communication circuit, and the Wi-Fi communication circuit may transmit a second signal, set to a high status, through a second GPIO to the UWB communication circuit. According to various embodiments, the UWB service manager may receive, from the Wi-Fi service manager, a use request for the communication band overlapping the operation channel. According to various embodiments, the UWB service manager may determine whether the operation channel is changeable and change the operation channel according to a result of the determination.

According to various embodiments, the Wi-Fi service manager may receive, from the UWB service manager, a use request for the operation channel overlapping the communication band. According to various embodiments, the Wi-Fi service manager may determine whether the communication band is changeable and change the communication band according to a result of the determination. According to various embodiments, the Wi-Fi service manager may determine whether to allow the UWB communication through the operation channel. According to various embodiments, if the UWB communication through the operation channel is allowed, the Wi-Fi service manager or the UWB service manager may determine priority between a first service for the UWB communication and a second service for the Wi-Fi communication.

According to various embodiments, if a priority of the first service for the UWB communication is higher than a priority for the second service for the Wi-Fi communication, the Wi-Fi service manager may change a Wi-Fi channel. According to various embodiments, if the priority of the first service for the UWB communication is not higher than the priority for the second service for the Wi-Fi communication, the UWB service manager may change the UWB channel.

An electronic device (e.g., the electronic device 101 of FIG. 1 or 5) according to various embodiments of the disclosure may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
an ultra-wideband (UWB) communication circuit;
a Wi-Fi communication circuit; and
a processor; and
memory storing instructions which, when executed by the processor, cause the electronic device to:
identify an operation channel of the UWB communication circuit,
identify a communication band of the Wi-Fi communication circuit, overlapping the operation channel of the UWB communication circuit, and when the communication band overlapping the operation channel is activated, determine whether to simultaneously perform Wi-Fi communication through the activated communication band and UWB communication through the operation channel, based on first information related to the UWB communication and second information related to the Wi-Fi communication.

2. The electronic device of claim 1, wherein the processor is configured to include:
a UWB service manager controlling the UWB communication circuit; and
a Wi-Fi service manager controlling the Wi-Fi communication circuit.

3. The electronic device of claim 2, wherein the Wi-Fi service manager is configured to:
receive, from the UWB service manager, the first information related to the UWB communication, and
transmit, to the UWB service manager, the second information related to the Wi-Fi communication.

4. The electronic device of claim 2, wherein the UWB service manager is configured to:
receive, from the Wi-Fi service manager, a use request for the communication band overlapping the operation channel, and
determine whether the operation channel is changeable and change the operation channel according to a result of the determination.

5. The electronic device of claim 2, wherein the Wi-Fi service manager is configured to:
receive, from the UWB service manager, a use request for the operation channel overlapping the communication band, and
determine whether the communication band is changeable and change the communication band according to a result of the determination.

6. The electronic device of claim 2, wherein the Wi-Fi service manager is configured to determine whether to allow the UWB communication through the operation channel, and
when the UWB communication through the operation channel is not allowed, wherein the Wi-Fi service manager or the UWB service manager is configured to determine priority between a first service for the UWB communication and a second service for the Wi-Fi communication.

7. The electronic device of claim 6, wherein when a priority of the first service for the UWB communication is higher than a priority for the second service for the Wi-Fi communication, the Wi-Fi service manager is configured to change a Wi-Fi channel, and
wherein when the priority of the first service for the UWB communication is not higher than the priority for the second service for the Wi-Fi communication, the UWB service manager is configured to change the operation channel.

8. The electronic device of claim 1, wherein the first information comprises at least one of the operation channel of the UWB communication, a period of the UWB communication, duration of the UWB communication, or priority information about a service of the UWB communication.

9. The electronic device of claim 1, wherein the second information comprises at least one of a traffic pattern of the Wi-Fi communication, a quality of service (QoS) of a service of the Wi-Fi communication, or priority information about the service of the Wi-Fi communication.

10. The electronic device of claim 1, wherein the UWB communication circuit and the Wi-Fi communication circuit are configured to communicate through general purpose input and output (GPIO),
when the UWB communication circuit communicates according to the operation channel, wherein the UWB communication circuit is configured to transmit a first signal, set to a high status, through a first GPIO to the Wi-Fi communication circuit, and
when the communication band of the Wi-Fi communication circuit overlapping the operation channel of the UWB communication circuit is activated, wherein the Wi-Fi communication circuit is configured to transmit a second signal, set to a high status, through a second GPIO to the UWB communication circuit.

11. A method for controlling communication of an electronic device, the method comprising:
identifying an operation channel of an ultra-wideband (UWB) communication circuit included in the electronic device;
identifying a communication band of a Wi-Fi communication circuit included in the electronic device overlapping the operation channel of the UWB communication circuit; and
when the communication band overlapping the operation channel is activated, determining whether to simultaneously perform Wi-Fi communication through the activated communication band and UWB communication through the operation channel, based on first information related to the UWB communication and second information related to the Wi-Fi communication.

12. The method of claim 11, further comprising:
controlling, via a UWB service manager of the electronic device, the UWB communication circuit; and
controlling, via a Wi-Fi service manager of the electronic device, the Wi-Fi communication circuit.

13. The method of claim 12, further comprising:
receiving, by the Wi-Fi service manager, the first information related to the UWB communication from the UWB service manager; and
transmitting, by the Wi-Fi service manager, the second information related to the Wi-Fi communication to the UWB service manager.

14. The method of claim 11, wherein the first information comprises at least one of the operation channel of the UWB communication, a period of the UWB communication, duration of the UWB communication, or priority information about a service of the UWB communication.

15. The method of claim 11, wherein the second information comprises at least one of a traffic pattern of the Wi-Fi communication, a quality of service (QoS) of a service of the Wi-Fi communication, or priority information about the service of the Wi-Fi communication.

16. A non-transitory computer-readable storage medium for storing instructions which, when executed by a processor of an electronic device, cause the electronic device to perform:
identifying an operation channel of an ultra-wideband (UWB) communication circuit included in the electronic device;
identifying a communication band of a Wi-Fi communication circuit included in the electronic device overlapping the operation channel of the UWB communication circuit; and
when the communication band overlapping the operation channel is activated, determining whether to simultaneously perform Wi-Fi communication through the activated communication band and UWB communication through the operation channel, based on first information related to the UWB communication and second information related to the Wi-Fi communication.

17. The non-transitory computer-readable storage medium of claim 16, wherein the instructions, when executed by the processor, cause the electronic device to perform:

controlling, via a UWB service manager of the electronic device, the UWB communication circuit; and controlling, via a Wi-Fi service manager of the electronic device, the Wi-Fi communication circuit.

18. The non-transitory computer-readable storage medium of claim 16, wherein the instructions, when executed by the processor, cause the electronic device to perform:

receiving, by the Wi-Fi service manager, the first information related to the UWB communication from the UWB service manager; and transmitting, by the Wi-Fi service manager, the second information related to the Wi-Fi communication to the UWB service manager.

19. The non-transitory computer-readable storage medium of claim 16, wherein the first information comprises at least one of the operation channel of the UWB communication, a period of the UWB communication, duration of the UWB communication, or priority information about a service of the UWB communication.

20. The non-transitory computer-readable storage medium of claim 16, wherein the second information comprises at least one of a traffic pattern of the Wi-Fi communication, a quality of service (QoS) of a service of the Wi-Fi communication, or priority information about the service of the Wi-Fi communication.

* * * * *